(12) United States Patent
Golembeski et al.

(10) Patent No.: US 9,135,188 B2
(45) Date of Patent: Sep. 15, 2015

(54) MULTI-MODE ADAPTER

(71) Applicant: Apple Inc., Cupertino, CA (US)

(72) Inventors: Gregg Golembeski, San Francisco, CA (US); Jason J. Yew, San Jose, CA (US); Shyam S. Toprani, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/538,364

(22) Filed: Nov. 11, 2014

(65) Prior Publication Data

US 2015/0169476 A1    Jun. 18, 2015

Related U.S. Application Data

(63) Continuation of application No. 13/607,563, filed on Sep. 7, 2012, now Pat. No. 8,886,849.

(60) Provisional application No. 61/646,043, filed on May 11, 2012.

(51) Int. Cl.
G06F 3/06 (2006.01)
G06F 13/10 (2006.01)
G06F 13/42 (2006.01)
G06F 13/00 (2006.01)

(52) U.S. Cl.
CPC ............ G06F 13/10 (2013.01); G06F 13/4221 (2013.01)

(58) Field of Classification Search
None
See application file for complete search history.

(56) References Cited

U.S. PATENT DOCUMENTS 5,387,110 A    2/1995 Kantner et al.
6,145,035 A    11/2000 Mai et al.
(Continued)

FOREIGN PATENT DOCUMENTS

JP    02-078171 A    3/1990
JP    2006-164706 A    6/2006
(Continued)

OTHER PUBLICATIONS

"Reversible USB connector fits into ports either ways", Free Press Release, Jun. 25, 2010, 1 page.
(Continued)

Primary Examiner — Scott Sun
(74) Attorney, Agent, or Firm — Kilpatrick Townsend & Stockton LLP

(57) ABSTRACT

An adapter can be used to connect a portable electronic device to an accessory in instances where the portable electronic device and the accessory have incompatible connectors. The adapter provides two connectors, one compatible with the portable electronic device and the other compatible with the accessory. The adapter has several modes of operation. The portable electronic device selects the appropriate mode of operation for the adapter once it receives information about the accessory connected to the adapter. The portable electronic device instructs the adapter to switch to the selected mode and in response the adapter configures its internal circuitry to enable the selected mode. The portable electronic device can then communicate with the accessory via the adapter. The presence of the adapter can be transparent to the accessory.

20 Claims, 15 Drawing Sheets

(56) References Cited

U.S. PATENT DOCUMENTS

| | | |
|---|---|---|
| 6,408,351 B1 | 6/2002 | Hamdi et al. |
| 6,438,640 B1 | 8/2002 | Miyamoto et al. |
| 6,934,561 B2 | 8/2005 | Burrus |
| 7,005,889 B2 | 2/2006 | Sowden et al. |
| 7,127,541 B2 | 10/2006 | Govindarajulu et al. |
| 7,305,254 B2 | 12/2007 | Findikli |
| 7,305,511 B2 | 12/2007 | Barrett et al. |
| 7,453,233 B2 | 11/2008 | Fischer et al. |
| 7,591,657 B2 | 9/2009 | Teicher |
| 7,762,470 B2 | 7/2010 | Finn et al. |
| 7,840,729 B2 | 11/2010 | Inoue et al. |
| 8,041,300 B2 | 10/2011 | Dorogusker et al. |
| 8,126,734 B2 | 2/2012 | Dicks et al. |
| 8,161,567 B2 | 4/2012 | Rubinstein et al. |
| 8,208,853 B2 | 6/2012 | Lydon et al. |
| 8,238,811 B2 | 8/2012 | Lydon |
| 8,275,924 B2 | 9/2012 | Krueger et al. |
| 8,280,465 B2 | 10/2012 | Dorogusker et al. |
| 8,296,587 B2 | 10/2012 | Paniagua et al. |
| 8,369,785 B2 | 2/2013 | Dorogusker et al. |
| 8,417,980 B1 | 4/2013 | Mimberg |
| 8,478,913 B2 | 7/2013 | Terlizzi et al. |
| 8,515,580 B2 | 8/2013 | Taylor et al. |
| 8,688,876 B1 | 4/2014 | Fritchman et al. |
| 8,762,605 B2 | 6/2014 | Terlizzi et al. |
| 8,886,849 B2 | 11/2014 | Golembeski et al. |
| 2004/0103223 A1 | 5/2004 | Gabehart et al. |
| 2006/0056401 A1 | 3/2006 | Bohm et al. |
| 2006/0156415 A1 | 7/2006 | Rubinstein et al. |
| 2007/0214305 A1 | 9/2007 | Levy |
| 2008/0140872 A1 | 6/2008 | Wright |
| 2008/0150480 A1 | 6/2008 | Navid |
| 2008/0319732 A1 | 12/2008 | Farnsworth |
| 2009/0063744 A1 | 3/2009 | Krueger et al. |
| 2009/0179768 A1 | 7/2009 | Sander et al. |
| 2009/0189588 A1 | 7/2009 | Tahata |
| 2009/0254746 A1 | 10/2009 | Aihara et al. |
| 2009/0319064 A1* | 12/2009 | Chang .......................... 700/94 |
| 2010/0064065 A1 | 3/2010 | Depta et al. |
| 2010/0075604 A1 | 3/2010 | Lydon et al. |
| 2010/0077121 A1 | 3/2010 | Lai et al. |
| 2010/0080563 A1 | 4/2010 | DiFonzo et al. |
| 2010/0180063 A1 | 7/2010 | Ananny et al. |
| 2010/0198286 A1 | 8/2010 | Neumiller et al. |
| 2011/0055407 A1 | 3/2011 | Lydon et al. |
| 2011/0061113 A1 | 3/2011 | Rubinstein et al. |
| 2011/0078354 A1 | 3/2011 | Krueger et al. |
| 2011/0167176 A1 | 7/2011 | Yew et al. |
| 2011/0276734 A1 | 11/2011 | Helfrich |
| 2012/0005395 A1 | 1/2012 | Lydon et al. |
| 2012/0096207 A1 | 4/2012 | Chen |
| 2012/0131230 A1 | 5/2012 | Ady et al. |
| 2012/0252261 A1 | 10/2012 | Wu |
| 2013/0080662 A1 | 3/2013 | Bourque |
| 2013/0086397 A1 | 4/2013 | Uchida |
| 2014/0075061 A1 | 3/2014 | Fritchman et al. |
| 2014/0075210 A1 | 3/2014 | Rich et al. |

FOREIGN PATENT DOCUMENTS

| | | |
|---|---|---|
| JP | 2008-225939 A | 9/2008 |
| TW | 201014052 A | 4/2010 |
| WO | 02/08872 A1 | 1/2002 |
| WO | 2009/032797 A2 | 3/2009 |
| WO | 2009/069969 A1 | 6/2009 |
| WO | 2010/027694 A1 | 3/2010 |
| WO | 2011/150403 A1 | 12/2011 |
| WO | 2012/112147 A1 | 8/2012 |

OTHER PUBLICATIONS

"USB-Peripheral to Ethernet Adapter: User Guide" Mobility Electronics, 2005, 16 pages.

International Search Report and Written Opinion for PCT Application No. PCT/US2013/034652, mailed Jun. 10, 2013, 14 pages.

International Search Report and Written Opinion for PCT Application No. PCT/US2013/035005, mailed Jul. 29, 2013, 8 pages.

International Search Report and Written Opinion for PCT Application No. PCT/US2012/067118, mailed on Aug. 1, 2013, 10 pages.

Extended European Search Report for European Application No. 12194586.9, mailed on Aug. 1, 2013, 6 pages.

International Search Report and Written Opinion for PCT Application No. PCT/US2013/034665, mailed on Aug. 20, 2013, 9 pages.

Extended European Search Report for European Application No. 13162311.8, Feb. 3, 2014, 5 pages.

Non-Final Office Action for U.S. Appl. No. 13/607,563, mailed Mar. 17, 2014, 8 pages.

Notice of Allowance mailed on Jul. 9, 2014 for U.S. Appl. No. 13/607,563, 7 pages.

European Communication mailed on Nov. 3, 2014 for EP Patent Application No. 13 162 311.8, 4 pages.

USB Implementers Forum: "Universal Serial Bus Specification Revision 2.0—Chapters 1-5 and 9", Internet Citation, Apr. 27, 2000, XP002412161, Retrieved from the Internet: URL:http://www.usb.org.developers/docs/usb_20_05122006.zip, retrieved on Dec. 19, 2006, 147 pages.

\* cited by examiner

| Pin | Connector 205 |
|---|---|
| 1 | DGND |
| 2 | DGND |
| 3 | DP_ML_LANE0_P |
| 4 | USB D+ |
| 5 | DP_ML_LANE0_N |
| 6 | USB D- |
| 7 | DP_ML_LANE1_P |
| 8 | Vbus |
| 9 | DP_ML_LANE1_N |
| 10 | Acc_ID |
| 11 | DP_HPD |
| 12 | NC |
| 13 | Acc_3v3 |
| 14 | NC |
| 15 | DGND |
| 16 | DGND |
| 17 | NC |
| 18 | Acc_Rx |
| 19 | Acc_Tx |
| 20 | Acc_Det |
| 21 | Y/PR |
| 22 | C/Y |
| 23 | Comp/Pb |
| 24 | Rem_Sen |
| 25 | DP_AUX_CH_P |
| 26 | DP_AUX_CH_N |
| 27 | Line_out_L |
| 28 | Line_Out_R |
| 29 | Aud_Ret |
| 30 | DGND |

MULTI-MODE ADAPTER

CROSS-REFERENCES TO RELATED APPLICATIONS

This application is a continuation of U.S. application Ser. No. 13/607,563, filed Sep. 7, 2012, which claims the benefit of and is a nonprovisional of U.S. provisional patent application No. 61/646,043 filed May 11, 2012, which is incorporated by reference. This application is related to U.S. provisional patent application No. 61/565,910, filed Dec. 1, 2011, which is incorporated by reference. This application is also related to U.S. provisional patent application Ser. No. 12/755,905, filed Apr. 7, 2010.

BACKGROUND

Portable electronic devices, such as portable media players, have become ubiquitous in today's society. As they have proliferated, so have the number and types of hardware accessories that are designed to interact with these portable media players. These accessories range in complexity, including, for example, simple speaker systems and complex automotive entertainment systems.

These accessories commonly communicate with a portable media player using a connector system. This connector system typically includes a plug connector on the accessory and a receptacle connector on the portable media player. A user fits the plug connector of the accessory into the receptacle connector of the portable media player thereby forming physical and electrical connections between the contacts of each connector that allow data and power to be exchanged between the devices.

Users may have multiple different portable media players. For various reasons, these media players may have different sized connectors. For example, the media players may be made by different manufacturers. Also, the media players may be made by the same one manufacturer, but a newer media player may have a more advanced, smaller sized connector receptacle than an older media player manufactured by the same company.

For these and other reasons, a user may encounter a situation where he/she has a portable media player but that media player is incompatible with certain accessories designed to operate with a different media player.

SUMMARY

Embodiments of the present invention are generally directed to electronic devices. Specifically, certain embodiments of the present invention provide an adapter that can be used to enable an accessory to communicate with a portable electronic device in situations where the accessory and the portable electronic device cannot be directly connected to each other.

When an accessory and a portable electronic device have incompatible connectors, an adapter of some sort may be needed to connect these devices together so that they can communicate with each other. An adapter according to an embodiment of the present invention includes two connectors, one of which is compatible with the accessory and the other is compatible with the portable electronic device. This allows the adapter to act as an intermediary device to relay signals to and from the accessory and the portable electronic device. Thus, the adapter enables the accessory to be "connected" to the portable electronic device.

In order for the adapter to be able to work with multiple accessories, the adapter has multiple modes of operation depending on the accessory type. Once an accessory is connected to the adapter (which is connected to the portable electronic device), the adapter sends the received accessory information to the portable electronic device. The portable electronic device determines the type of accessory based on the accessory information and then selects an operation mode for the adapter. The portable electronic device then instructs the adapter to enable the selected mode. Once the portable electronic device receives confirmation from the adapter that the selected mode is enabled, it can then communicate with the accessory via the adapter. The presence of the adapter is completely transparent to the accessory in most instances.

In a particular embodiment of a present invention, a portable electronic device is provided that detects connection of the adapter. The adapter may inform the portable electronic device that the adapter has an additional port that can accept an accessory. The portable electronic device can then instruct the adapter to enable the additional port. Once an accessory is connected to the additional port, the portable electronic device may receive information about the accessory from the adapter. The portable electronic device may then determine the type of accessory connected and may select and appropriate mode of operation for the adapter. The portable electronic device may then instruct the adapter to enable the selected mode. Once the selected mode is enabled by the adapter, the portable electronic device can communicate with the accessory via the adapter using a set of messages.

The following detailed description together with the accompanying drawings will provide a better understanding of the nature and advantages of the present invention.

DESCRIPTION OF ILLUSTRATIVE EMBODIMENTS

Figure 1:
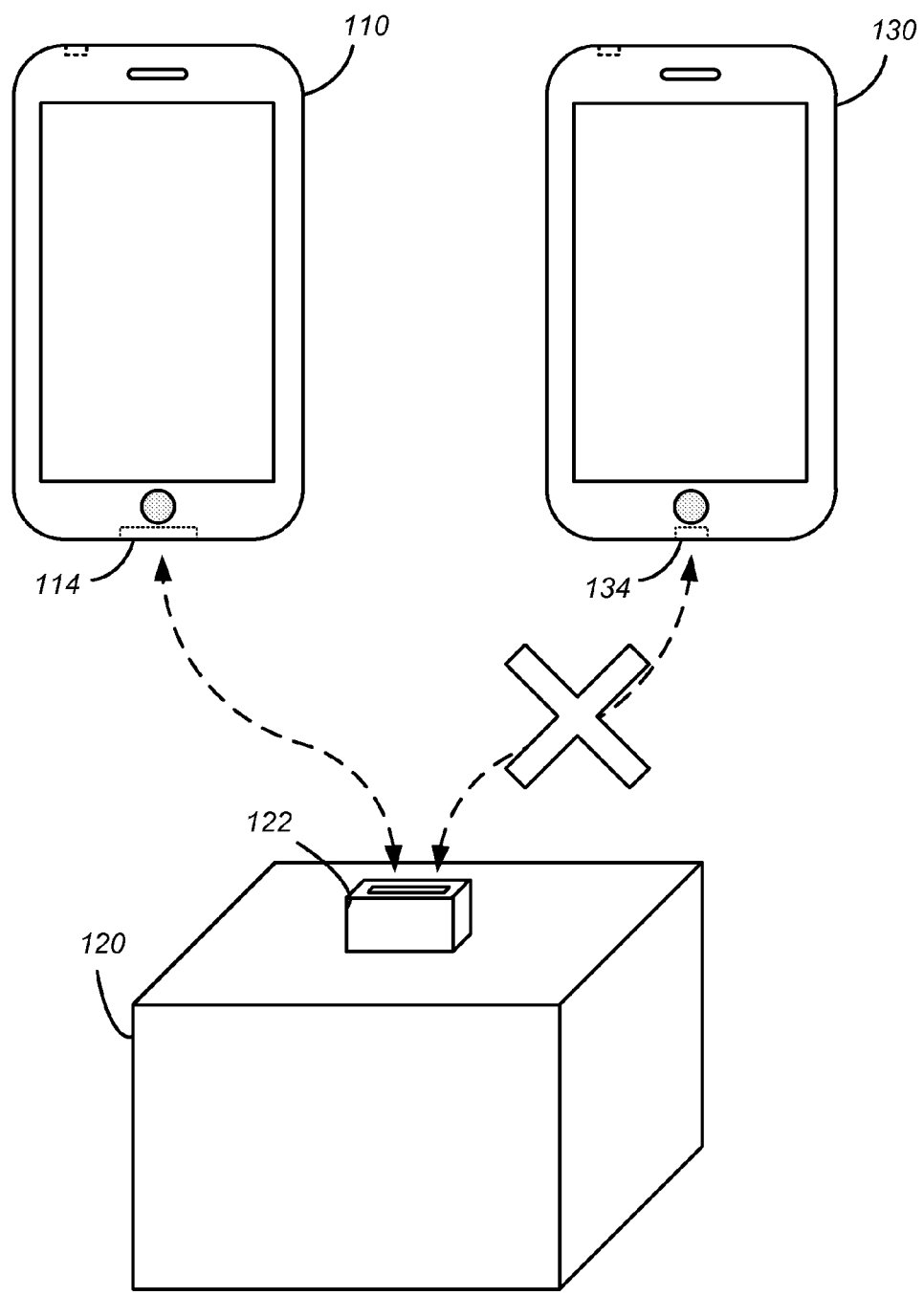
FIG. 1 illustrates an electronic system that is improved by the incorporation of an embodiment of the present invention.

FIG. 1 illustrates a hardware accessory 120 that a user may want to connect to two different portable electronic devices 110 and 130 in order to, for example, extend the functionality of each of devices 110 and 130. In this example, portable electronic device 110 is a first portable media player that includes a receptacle connector 114 and a touchscreen 116. Portable media player 110 may be an iPod®, iPhone®, or similar device designed and manufactured by Apple Inc. of Cupertino, Calif., but it is to be understood that the present invention is not limited to any particular type of portable electronic media player or other device.

Accessory 120 may be an automotive radio, transmitter, cable, audio/video receiver, storage device, clock radio, or other device. Accessory 120 may include a plug connector 122 that includes a plurality of contacts (not shown) that carry electrical signals for one or more of data, audio, video, control functions and power. In one embodiment, plug connector 122 includes between 4 and 30 contacts but the present invention is not limited to any particular contact count or configuration.

Receptacle connector 114 includes a cavity in which a plurality of pins or contacts (not shown) are positioned. Plug connector 122 and receptacle connector 114 are designed to mate with each other to physically and electrically couple the contacts in connector 114 with the contacts within connector 122 so that signals can be transmitted between the contacts. Thus, plug connector 122 and receptacle connector 114 can be said to be "compatible" with each other. When the connectors 114 and 122 are mated, portable media player 110 can exchange information with accessory 120 to enable, for example, allowing the accessory to play music that is stored on media player 110.

Various portable media players and other electronic devices may include receptacle connectors that are of different shape, size or pin configuration than receptacle connector 114, in which case these other receptacle connectors may not be compatible with or may be "incompatible" with plug connector 122. A plug connector on an accessory may not be compatible with a receptacle connector on a portable electronic device or portable media player because the plug connector is designed to mate with products made by a first manufacturer, while the portable media player is instead made by a second manufacturer. Also, a portable media player manufacturer may change the design of a receptacle connector for some products, such as newer generation products. For example, a smaller connector may be incorporated into newer generation products to enable the design of smaller portable media players. Also, a connector with a different pin-out may support new data communication protocols that could not be supported by an older legacy connector.

There are at least two types of incompatibility that may arise between a plug connector on an accessory and a receptacle connector on a host electronic device/portable electronic device. First, the receptacle connector may be physically incompatible with the plug connector, that is, they may have incompatible sizes and literally cannot be connected together in a mechanical sense. FIG. 1 provides an example of connectors that are physically incompatible with each other. Specifically, a portable electronic device 130 is shown in FIG. 1 that includes a receptacle connector 134 that is considerably smaller than receptacle connector 114 incorporated within portable electronic device 110. Plug connector 122 is too large to fit within connector 134 and thus connectors 134 and 122 are "incompatible" connectors that cannot be mated with each other.

As a second example of incompatible connectors, a plug connector on an accessory may not be compatible with a receptacle connector on a portable electronic device because one or more signals or power supply outputs on either the plug connector or receptacle connector are incompatible with inputs on the other end. This may occur at one or more levels of signaling. For example, a physical layer used to transmit and receive signals may be incompatible between the accessory and the portable electronic device. Specifically, signal voltages and other physical parameters may be different. Also, at the transport level, which specifies signal frequency and other parameters, may be different between the devices. The packet structure layer, which defines how messages and data are formatted, and multi-packet logic levels, which define sequences of messages, may also vary among devices. In some embodiments, a pin on the plug connector may be assigned to a function (e.g., analog audio) and a corresponding pin on the receptacle connector may be assigned to a different function (e.g., digital audio).

Embodiments of the present invention provide an adapter that allows communication between a portable electronic device and an accessory in instances where a receptacle connector on the portable electronic device and a plug connector on an accessory are incompatible in one or both of these ways. One example is shown in FIG. 2 which illustrates an electronic system according to an embodiment of the present invention.

Figure 2:
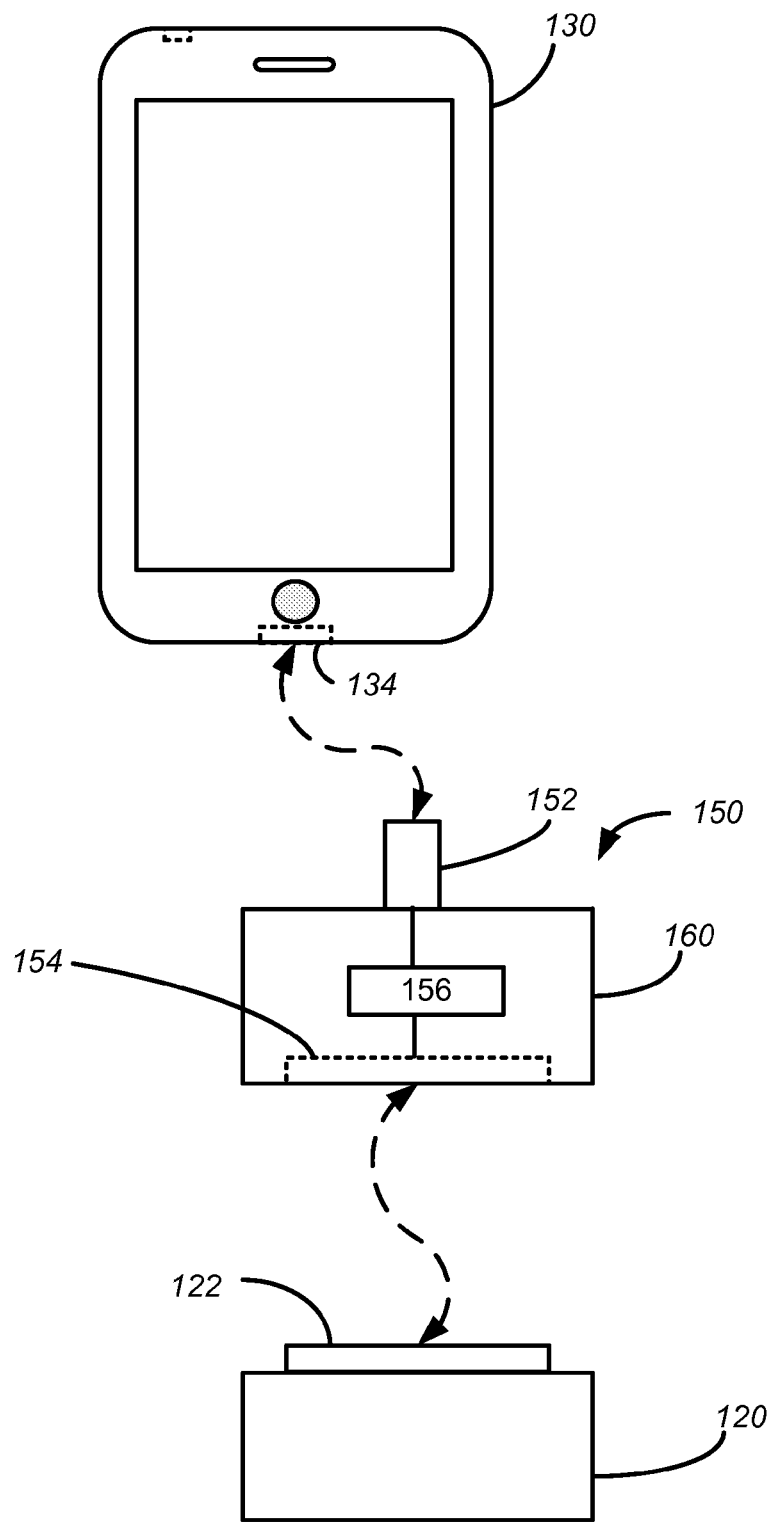
FIG. 2 illustrates an electronic system that includes an adapter according to an embodiment of the present invention that allows communication between an accessory and a portable electronic device.

As illustrated in FIG. 2, portable electronic device 130 has a receptacle connector 134. Accessory 120 includes a plug connector 122 that is physically larger than connector 134. Thus, accessory 120 cannot be directly connected to portable electronic device 130. FIG. 2 also shows an adapter 150 that may be used to connect accessory 120 and portable electronic device 130. Adapter 150 includes a plug connector 152 that has a form factor that is compatible with connector 134 of portable electronic device 130. Adapter 150 also includes another connector 154, which is a receptacle connector that is of the same form factor as and compatible with plug connector 122 of accessory 120. Thus, adapter 150 can be used to physically and electrically connect portable electronic device 130 and accessory 120 even though they may have incompatible connectors. Adapter 150 includes a housing 160 in which both the connectors are formed. Adapter 150 includes control circuitry 156 that controls the operation of the adapter. In one embodiment, plug connector 152 may be an eight-contact (plus a ground contact) in-line dual orientation connector.

Figure 3:
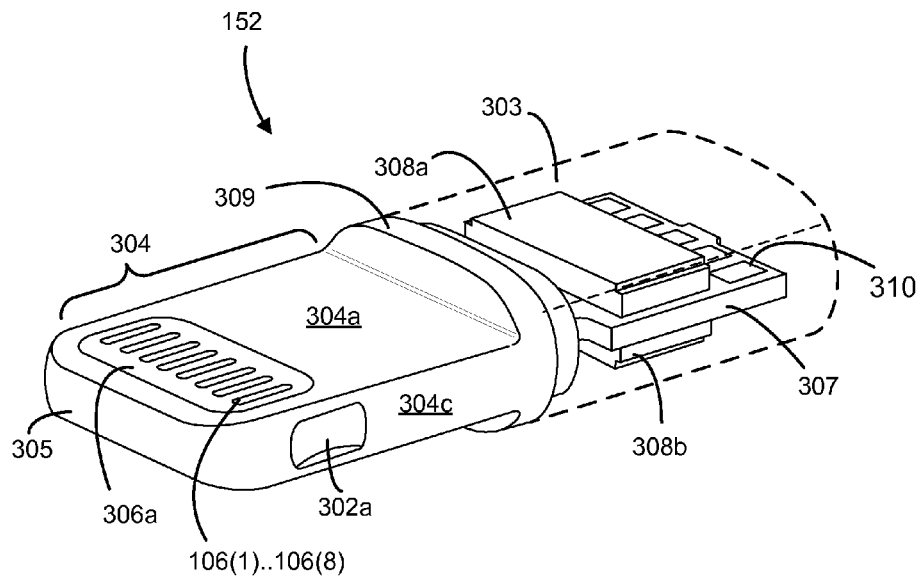
FIG. 3 illustrates a plug connector that is included in an adapter according to one embodiment of the present invention.

FIG. 3 illustrates a perspective view of plug connector 152 according to an embodiment of the present invention. Plug connector 152 includes a body 303 and a tab portion 304 that extends longitudinally away from body 303 in a direction parallel to the length of the connector. Body 303 can be part of housing 160 of adapter 150 or can be a structural component of connector 152 that enables the connector to be attached to housing 160. Additionally, in some embodiments, adapter 150 may include a cable that extends from housing 160 to plug connector 152 providing more flexibility for the plug connector to be mated with a portable media device.

Tab 304 is sized to be inserted into a corresponding receptacle connector, such as receptacle connector 134 of portable media player 130 shown in FIG. 2, during a mating event and includes a first contact region 306a formed on a first major surface 304a and a second contact region 306b (not shown in FIG. 3) formed at a second major surface 304b (also not shown) opposite surface 304a. Surfaces 304a, 304b extend from a distal tip of the tab to a spine 309 that, when tab 304 is inserted into a corresponding receptacle connector, abuts a housing of the receptacle connector or portable electronic device the receptacle connector is incorporated in. Tab 304 also includes first and second opposing side surfaces 304c, 304d that extend between the first and second major surfaces 304a, 304b. In one particular embodiment, tab 304 is 6.6 mm wide, 1.5 mm thick and has an insertion depth (the distance from the tip of tab 304 to spine 309) of 7.9 mm.

The structure and shape of tab 304 is defined by a ground ring 305 that can be made from stainless steel or another hard conductive material. Connector 152 includes retention features 302a, 302b (not shown) formed as curved pockets in the sides of ground ring 305 that double as ground contacts. Body 303 is shown in FIG. 3 in transparent form (via dotted lines) so that certain components inside the body are visible. As shown, within body 303 is a printed circuit board (PCB) 307 that extends into ground ring 305 between contact regions 306a and 306b towards the distal tip of connector 152. One or more integrated circuits (ICs), such as Application Specific Integrated Circuit (ASIC) chips 308a and 308b, can be operatively coupled to PCB 307 to provide information regarding connector 152 and adapter 150 and/or to perform specific functions, such as authentication, identification, contact configuration and current or power regulation.

As an example, in one embodiment an ID module is embodied within an IC operatively coupled to the contacts of connector 152. The ID module can be programmed with identification and configuration information about the connector and/or its associated accessory/adapter that can be communicated to a host device during a mating event. As another example, an authentication module programmed to perform an authentication routine, for example a public key encryption routine, with circuitry on the host device can be embodied within an IC operatively coupled to connector 152. The ID module and authentication module can be embodied within the same IC or within different ICs. As still another example, in embodiments where adapter 150 enables an accessory to charge the host device connected to connector 152, a current regulator can be embodied within one of IC's 308a or 308b. The current regulator can be operatively coupled to contacts that are able to deliver power to charge a battery in the portable electronic device and regulate current delivered over those contacts to ensure a constant current regardless of input voltage and even when the input voltage varies in a transitory manner.

Bonding pads 310 can also be formed within body 303 near the end of PCB 307. Each bonding pad can be connected to a contact or contact pair within regions 306a and 306b. Wires (not shown) can then be soldered to the bonding pads to provide an electrical connection from the contacts to circuitry within adapter 150. In some embodiments, however, bonding pads are not necessary and instead all electrical connections between the contacts and components of connector 152 and other circuitry within adapter 150 are made through traces on a PCB that the circuitry is coupled to and/or by interconnects between multiple PCBs within adapter 150.

As shown in FIG. 3 eight external contacts 106(1) . . . 106(8) are spaced apart along a single row in contact region 306a. A similar set of eight contacts are spaced apart along a single row in contact region 306b. The two rows of contacts are directly opposite each other and each contact in contact region 306a is electrically connected to a corresponding contact in contact region 306b on the opposite side of the connector. Contacts 106(1) . . . 106(8) can be used to carry a wide variety of signals including digital signals and analog signals as well as power and ground.

FIG. 4 depicts one particular implementation of a pin-out for plug connector 152 according to one embodiment of the invention. The pin-out shown in FIG. 4 includes two contacts 106(4), 106(5) that are electrically coupled together to function as a single contact dedicated to carrying power; an accessory ID contact 106(8); an accessory power contact 106(1); and four data contacts 106(2), 106(3), 106(6) and 106(7). Power contacts 106(4), 106(5) can be sized to handle any reasonable power requirement for a portable electronic device, and for example, can be designed to carry between 3-20 Volts from an accessory to charge a portable electronic device connected to connector 152. Power contacts 106(4), 106(5) are positioned in the center of contact regions 306a, 306b to improve signal integrity by keeping power as far away as possible from the sides of ground ring 305.

Accessory power contact 106(1) can be used for an accessory power signal that provides power from the host to an accessory. The accessory power signal is typically a lower voltage signal than the power in signal received over contacts 106(4) and 106(5), for example, 3.3 volts as compared to 5 volts or higher. The accessory ID contact provides a communication channel that enables the host device to authenticate the accessory and enables the accessory to communicate information to the host device about the accessory's capabilities as described in more detail below.

Data contacts 106(2), 106(3), 106(6) and 106(7) can be used to enable communication between the host and accessory using one or more of several different communication protocols. Data contacts 106(2) and 106(3) are positioned adjacent to and on one side of the power contacts, while data contacts 106(6) and 106(7) are positioned adjacent to but on the other side of the power contacts. The accessory power and accessory ID contacts are positioned at each end of the connector. The data contacts can be high speed data contacts that operate at rate that is two or three orders of magnitude faster than any signals sent over the accessory ID contact which makes the accessory ID signal look essentially like a DC signal to the high speed data lines. Thus, positioning the data contacts between the power contacts and the ID contact improves signal integrity by sandwiching the data contacts between contacts designated for DC signals or essentially DC signals.

Figure 4A:
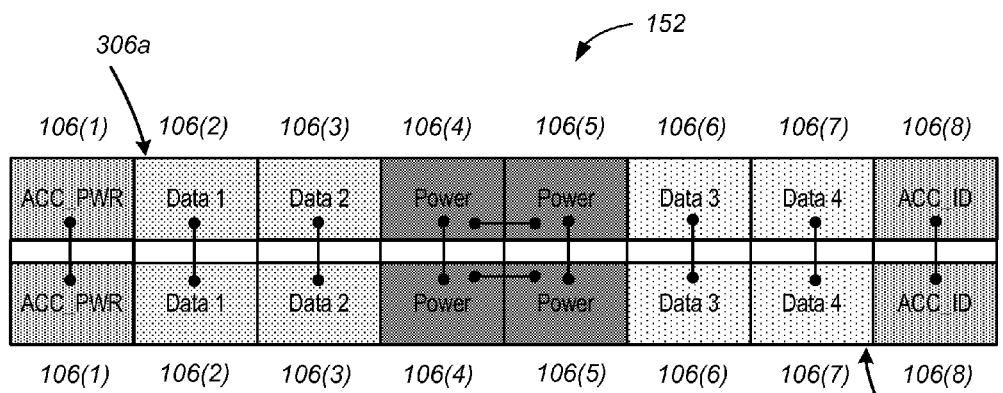
FIG. 4A illustrates an exemplary pin-out of plug connector shown in FIG. 3 according to an embodiment of the present invention.
Figure 4B:
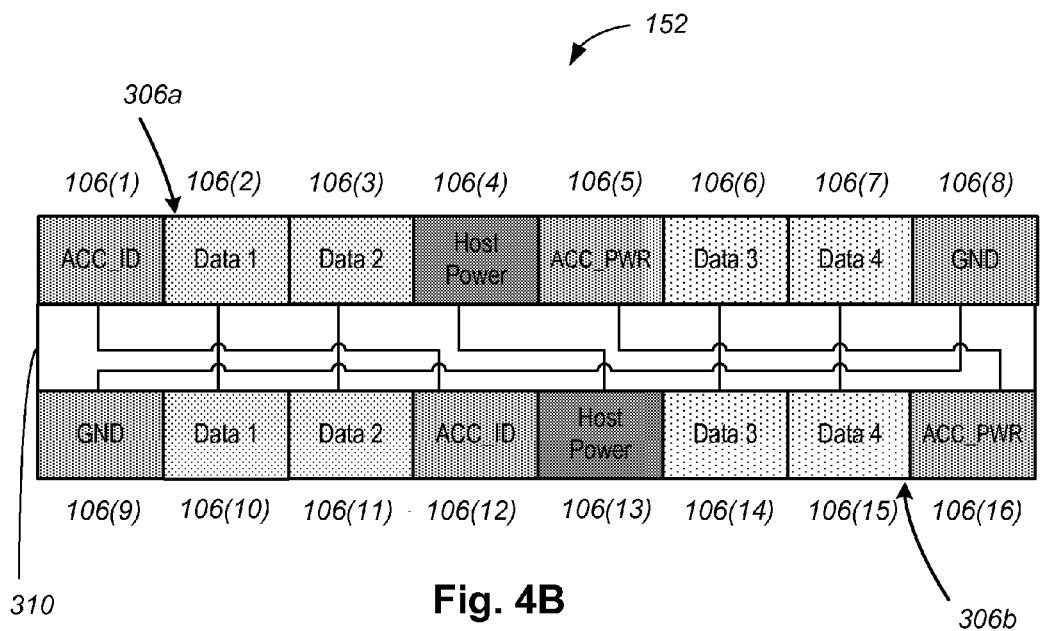
FIG. 4B illustrates another exemplary pin-out of plug connector shown in FIG. 3 according to an embodiment of the present invention.

FIG. 4A depicts another particular implementation of a pin-out for plug connector 152 according to another embodiment of the invention. The connector illustrated in FIG. 4A is also a reversible connector in that based on the orientation in which the connector is mated with a corresponding connector of a host device, either the contacts on the surface 306a or 306b are in contact with the contacts in the corresponding connector of the host device. As illustrated in FIG. 4A, there are eight contacts arranged on an upper surface of a PCB 310 and eight contacts arranged on a lower surface of PCB 310.

Connector 152 of FIG. 4A includes two contacts 106(1) and 106(12) that can function as accessory ID contacts to carry the identification signals between the accessory and the portable electronic device. Contacts 106(1) and 106(12) are electrically connected to each other. The connector can have four pairs of data contacts, (a) 106(2) and 106(3), (b) 106(6) and 106(7), (c) 106(10) and 106 (12), and (d) 106(14) and 106(15). In this particular embodiment, opposing data contacts, e.g., 106(2) and 106(10), are electrically connected to each other via PCB 310 as illustrated in FIG. 4A. Connector 152 of FIG. 4A further includes host power contacts 106(4) or 106(13) that may be electrically connected to each other. Host power contacts 106(4) or 106(13) carry power to the host device that is mated with connector 152. For example, plug connector 152 may be part of a power supply system designed to provide power to the host device. In this instance, either contact 106(4) or 106(13) may carry power from the power supply to the host device, e.g., to charge a battery in the host device.

Connector 152 of FIG. 4A may further include accessory power contacts 106(5) and 106(16) that may be electrically connected to each other, e.g, via PCB 310. Accessory power contacts carry power from the host device to a connected accessory. For example, in some instances, an accessory connected to the host device may not be self-powered and may derive its power from the host device. In this instance, the host device can supply power to the accessory over either of the accessory contacts, depending on the orientation of connector 152. Connector 152 of FIG. 4A may further include two ground contacts 106(8) and 106(9) electrically connected to each other. The ground contacts provide a ground path for connector 152.

Figure 5B:
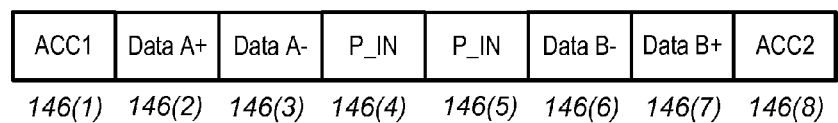
FIGS. 5B and 5C are diagrams illustrating a pin-out arrangement of a receptacle connector according to two different embodiments of the invention configured to mate with plug connectors 152 as shown in FIGS. 4A and 4B, respectively.
Figure 5C:
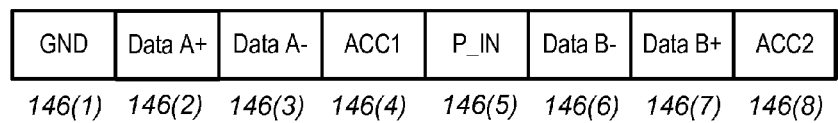
Figures 5A, 8:
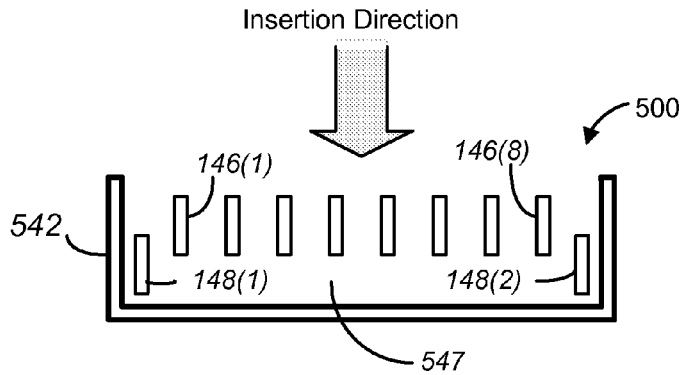
FIG. 5A illustrates a receptacle connector that is compatible with connector shown in FIG. 3.
FIG. 8 illustrates an exemplary pin-out of a 30-pin receptacle connector that is included in the adapter according to one embodiment of the present invention.

FIG. 5A depicts cross-sectional view of one embodiment of a receptacle connector 500 that connector 152 can be coupled with. Receptacle connector 500 can, for example, be included in portable media player 130 as connector 134. As shown in FIG. 5A, receptacle connector 500 includes eight contacts 146(1) . . . 146(8) that are spaced apart in a single row. The contacts are positioned within a cavity 547 that is defined by a housing 542. Receptacle connector 500 also includes side retention mechanisms (not shown) that engage with retention features 302a, 302b in connector 152 to secure connector 152 within cavity 547 once the connectors are mated. Receptacle connector 500 also includes two contacts 148(1) and 148(2) that are positioned slightly behind the row of signal contacts and can be used to detect when connector 152 is inserted within cavity 547 and detect when connector 152 exits cavity 547 when the connectors are disengaged from each other.

When tab 304 of connector 152 is fully inserted within cavity 547 of receptacle connector 500 during a mating event between the plug and receptacle connectors, each of contacts 106(1) . . . 106(8) from one of contact regions 106a or 106b are physically coupled to one of contacts 146(1) . . . 146(8) depending on the insertion orientation of connector 152 with respect to connector 500. Thus, contact 146(1) will be physically connected to either contact 106(1) or 106(8) depending on the insertion orientation; data contacts 146(2), 146(3) will connect with either data contacts 106(2), 106(3) or with data contacts 106(7), 106(6) depending on the insertion orientation, etc.

FIGS. 5B and 5C illustrate pin-out configuration for a receptacle connector 500 according to two different embodiments of the present invention. In one embodiment, receptacle connector 500 has a pin-out as shown in FIG. 5B that matches pin-out of connector in FIG. 4A and in another embodiment, receptacle connector 500 has a pin-out as shown in FIG. 5C that matches pin-out of connector of FIG. 4B. In each of FIGS. 5B and 5C, the ACC1 and ACC2 pins are configured to mate with either the accessory power (ACC_PWR) or accessory ID (ACC_ID) pins of the plug connector depending on the insertion orientation of plug connector, the pair of Data A contacts is configured to mate with either the pair of Data 1 contacts or the pair of Data 2 contacts of the plug connector, and the P_IN (power in) pin or pins are configured to mate with the Host Power contact or contacts of the plug connector. Additionally, in the pin-out of FIG. 5C, the GND contact is configured to mate with the GND contact in the plug connector.

Referring again to FIG. 2, receptacle connector 154 of adapter 150 may be a 30-pin connector compatible with Apple iPod®, iPad®, and iPhone® devices. FIG. 8 illustrates a pin-out arrangement for connector 154 according to an embodiment of the present invention.

Figure 6:
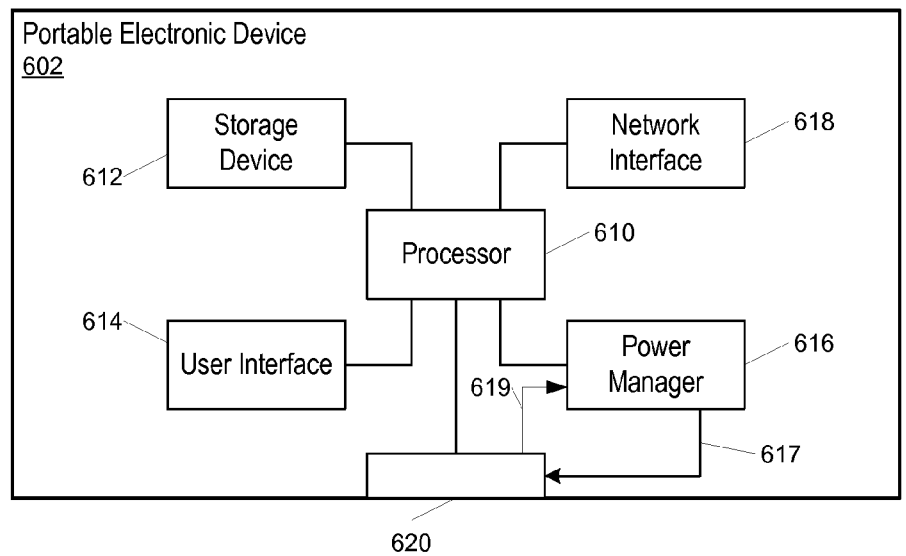
FIG. 6 is a functional block diagram of a portable electronic device according to an embodiment of the present invention.

FIG. 6 is a functional block diagram of a portable electronic device according to an embodiment of the present invention. Portable electronic device 602 (e.g., implementing portable electronic device 130 of FIG. 1) can provide computing, communication and/or media playback capability. Portable electronic device 602 can include a processor 610, storage device 612, user interface 614, power manager 616, network interface 618, and accessory input/output (I/O) interface 620. Portable electronic device 602 can also include other components (not explicitly shown) to provide various enhanced capabilities.

Storage device 612 can be implemented, e.g., using disk, flash memory, or any other non-transitory or non-volatile storage medium. In some embodiments, storage device 612 can store media assets such as audio, video, still images, or the like, that can be played by portable electronic device 602. Storage device 612 can also store other information such as a user's contacts (names, addresses, phone numbers, etc.); scheduled appointments and events; notes; and/or other personal information. In some embodiments, storage device 612 can store one or more application programs to be executed by processor 610 (e.g., video game programs, personal information management programs, media playback programs, etc.).

User interface 614 can include input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). A user can operate input devices of user interface 614 to invoke the functionality of portable electronic device 602 and can view and/or hear output from portable electronic device 602 via output devices of user interface 614.

Processor 610, which can be implemented as one or more integrated circuits (e.g., a conventional microprocessor or microcontroller), can control the operation of portable electronic device 602. In some embodiments, single-core processors, multi-core processors, and/or multi-processor systems may be implemented. In various embodiments, processor 610 can execute a variety of programs in response to program code and can maintain multiple concurrently executing programs or processes. At any given time, some or all of the program code to be executed can be resident in processor 610 and/or in storage media such as storage device 612. Processor 610 can also operate other programs to control other functions of portable electronic device 602. In some embodiments, processor 610 implements a protocol daemon and other programs to manage communication with one or more connected accessories (e.g., adapter 150 and accessory 120); examples are described below. In other embodiments, processor 610 can determine the type of accessory connected to the adapter and based on that information instruct the adapter to enable a specific mode of the adapter.

Power manager 616 provides power management capability for portable electronic device 602. For example, power manager 616 can deliver power from a battery (not explicitly shown) to accessory I/O interface 320 via line 617 and to other components of portable electronic device 602 (power connections not shown). Power manager 616 can also receive power via accessory I/O interface 620 and line 619 and deliver received power to various components of portable electronic device 602; power received from an accessory can also be delivered to the battery, thereby allowing the battery to be recharged via accessory I/O interface 620. In some embodiments, power manager 616 can be implemented using programmable or controllable circuits operating in response to control signals generated by program code executing on processor 610 or as a separate microprocessor or microcontroller.

In some embodiments, power manager 616 is responsive to signals from a sensor (not explicitly shown) in accessory I/O interface 620. The sensor can generate a signal indicative of the type of accessory connected, and power manager 616 can use this information to determine, e.g., whether to distribute power from the battery or power received from accessory I/O interface 620. Power manager 616 can also provide other power management capabilities, such as regulating power consumption of other components of portable electronic device 602 based on the source and amount of available power, monitoring stored power in the battery and generating user alerts if the stored power drops below a minimum level, and so on.

Network interface 618 can provide voice and/or data communication capability for portable electronic device 602. In some embodiments network interface 618 can include radio frequency (RF) transceiver components for accessing wireless voice and/or data networks (e.g., using cellular telephone technology, advanced data network technology such as 3G, EDGE, or 4G (e.g., LTE network), WiFi (IEEE 802.11 family standards), or other mobile communication technologies, or any combination thereof), GPS receiver components, and/or other components. In some embodiments network interface 618 can provide wired network connectivity (e.g., Ethernet) in addition to or instead of a wireless interface. Network interface 618 can be implemented using a combination of hardware (e.g., antennas, modulators/demodulators, encoders/decoders, and other analog and/or digital signal processing circuits) and software components.

Accessory I/O interface 620 can allow portable electronic device 602 to communicate with various accessories. For example, accessory I/O interface 620 can support connections to an adapter, a computer, an external speaker dock or media playback station, a digital camera, a radio tuner (e.g., FM, AM and/or satellite), an in-vehicle entertainment system, an external video device, card reader, disc reader, or the like. In accordance with some embodiments of the invention, accessory I/O interface 620 can support connection to multiple accessories in a daisy chain configuration, allowing portable electronic device 602 to manage concurrent communication with multiple accessories.

In some embodiments, accessory I/O interface 620 can include a receptacle connector, such as a connector 500 as illustrated in FIG. 5, as well as supporting circuitry for the connector. The connector can provide connections for power and ground as well as for various wired communication interfaces such as Universal Serial Bus (USB), FireWire (IEEE 1394 standard), and/or universal asynchronous receiver/transmitter (UART). The connector can also provide connections for audio and/or video signals, which may be transmitted to or from portable electronic device 602 in analog and/or digital formats. Thus, accessory I/O interface 620 can support multiple communication channels, and a given accessory can use any or all of these channels.

Figure 7:
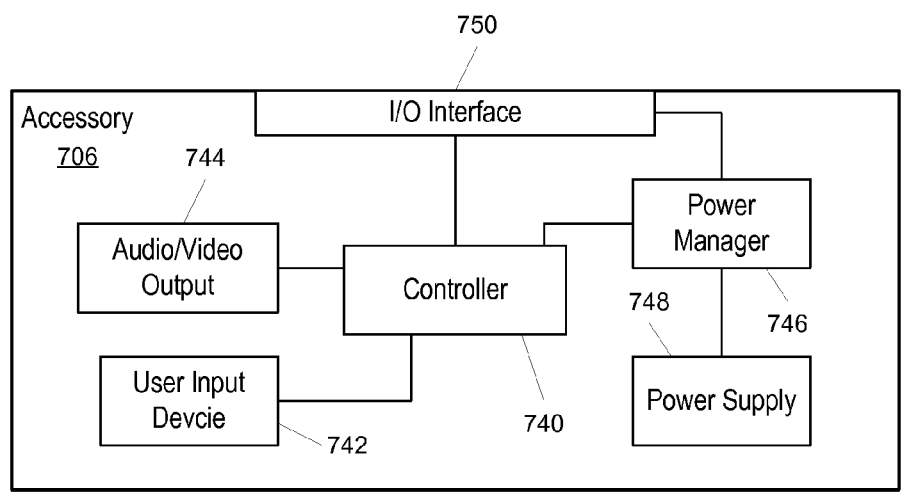
FIG. 7 is a functional block diagram of an accessory according to an embodiment of the present invention.

FIG. 7 is a functional block diagram of an accessory according to an embodiment of the present invention. Accessory 706 (e.g., implementing accessory 120 of FIG. 2) can include controller 740, user input device 742, audio/video output device 744, power manager 746, power supply 748 and I/O interface 750. Accessory 706 is representative of a broad range of accessories that can have their own functionality and be connected to portable electronic device 302 via an intermediary such as adapter 150. Accessories can vary widely in capability, complexity, and form factor. Various accessories may include components not shown in FIG. 7, including but not limited to storage devices (disk, flash memory, etc.) with fixed or removable storage media; camera components such as lenses, image sensors, and controls for same (e.g., aperture, zoom, exposure time, frame rate, etc.); microphones for recording audio (either alone or in connection with video recording); and so on.

Controller 740 can include, e.g., a microprocessor or microcontroller executing program code to perform various operations associated with accessory 706. For example, where accessory 706 incorporates a sound and/or video system, program code executed by controller 740 can include programs for digital audio decoding, analog or digital audio processing, and the like.

User input device 742 may include user-operable controls such as a touch pad, touch screen, scroll wheel, click wheel, dial, button, switch, keyboard, keypad, microphone, or the like. A user can operate the various input controls of user interface 734 to invoke functionality of accessory 706, and such functionality may include exchanging control signals, data, or other communications with portable electronic device 602 either directly or via an intermediary such as adapter 150. In some embodiments, the communications sent and received by accessory 706 can be independent of whether an intermediary is present.

In some embodiments, accessory 706 can also provide output devices such as audio/video output device 744. In some embodiments, audio/video output device 744 can include speakers and/or connection ports for connecting external speakers or headphones; a video screen and/or a connection port for connecting an external video screen, indicator lights, or the like, together with supporting electronics (e.g., digital-to-analog or analog-to-digital converters, signal processors or the like). These components can be coupled to receive audio and/or video signals via I/O interface 750. Such components can allow the user to view and/or hear output from accessory 706.

Power manager 746 can provide power management capability for accessory 706. For example, power manager 746 can be configured to receive power from a power supply 748. In some embodiments, power supply 748 can include a connection to an external power source (e.g., the standard electric grid); for example, power supply 748 can include an AC-DC converter that can be internal or external to accessory 706. In other embodiments, power supply 748 can include a battery or other energy storage device. Power manager 746 can deliver power from power supply 748 to various components of accessory 706. In addition, in some embodiments, power manager 746 can deliver power to upstream accessories, e.g., adapter 150, via I/O interface 750.

I/O interface 750 can allow accessory 706 to communicate with portable electronic device 602 either directly or through an intermediary such as adapter 150. In some embodiments, I/O interface 750 can include a connector that can mate directly with a connector included in adapter 150, such as a 30-pin connector similar to the one found on various iPod® products. Such a connector can be used to supply power to portable electronic device 602 or receive power from portable electronic device 602, to receive audio and/or video signals in analog and/or digital formats, and to communicate information via various interfaces such as USB, UART, and/or FireWire. All these signals can be communicated via an intermediary such as adapter 150.

It will be appreciated that the system configurations and components described herein are illustrative and that variations and modifications are possible. The portable electronic device and/or the accessory may have other capabilities not specifically described herein (e.g., mobile phone, global positioning system (GPS), broadband data communication, Internet connectivity, etc.).

Figure 9:
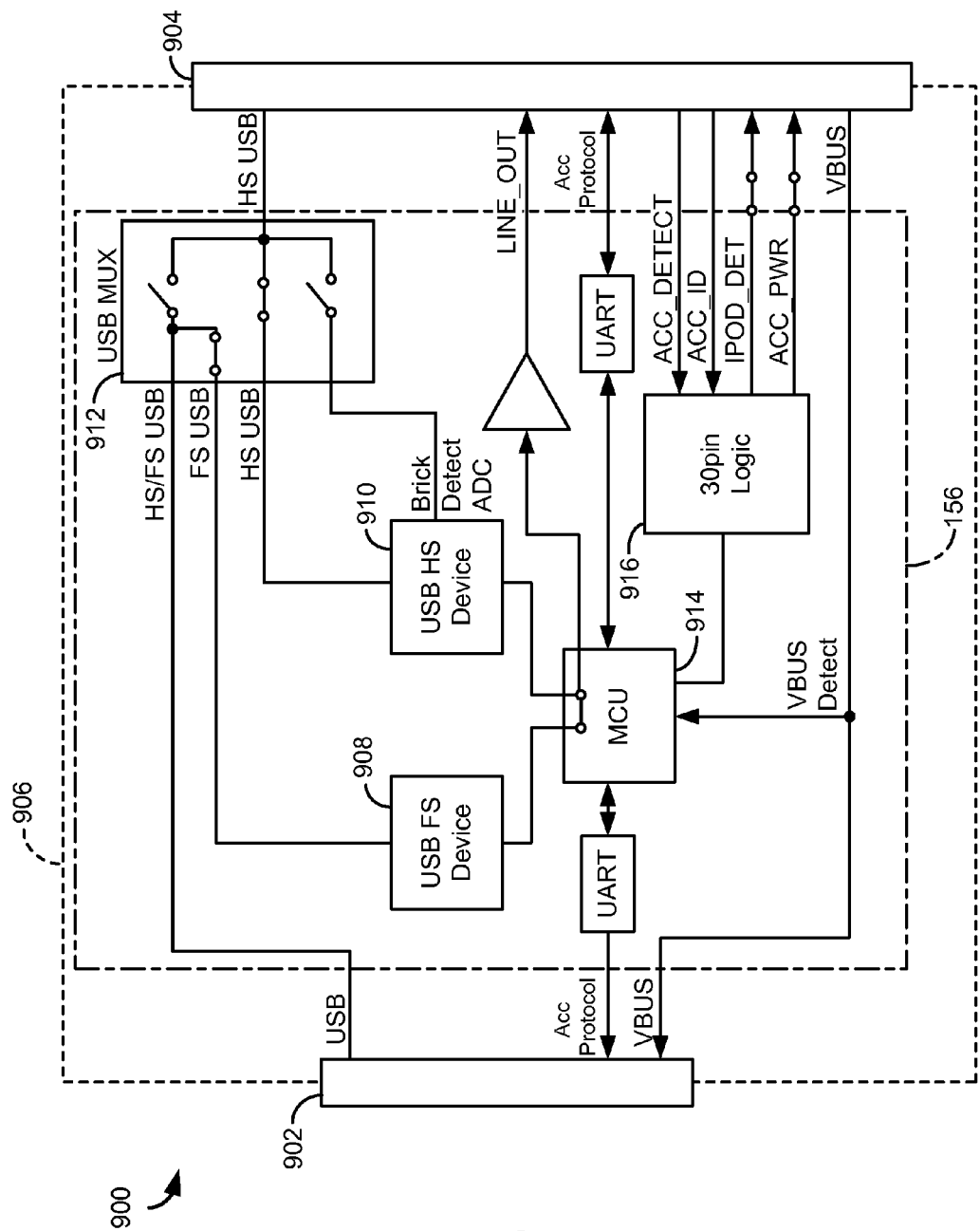
FIG. 9 is a functional block diagram of an adapter according to an embodiment of the present invention.

FIG. 9 is a functional block diagram of an adapter 900 according to an embodiment of the present invention. Adapter 900 can be implemented as adapter 150 of FIG. 2. Adapter 900 includes a first connector 902 and a second connector 904. In some embodiments, first connector 902 can be implemented as plug connector 152 and second connector 904 can be implemented as connector 154 of FIG. 2. Both connectors are either formed in housing 906 or attached to housing 906. Adapter 900 also includes a first USB device 908 and a second USB device 910. The two USB devices enable coupling of signals between connector 902 and 904 in various modes of operation described below. A USB multiplexer 912 aids in selective activation of various signal paths within adapter 900.

Controller 914 can include, e.g., a microprocessor or microcontroller executing program code to perform various operations associated with adapter 900. Controller 914 controls the operation of adapter 900 including, but not limited to receiving instructions from a connected portable electronic device for changing an operation mode of adapter 900, selectively activating certain components/signal paths in conjunction with USB multiplexer 912 to place adapter 900 into the requested mode, and generally controlling the signal flow to and from connectors 902 and 904.

Logic circuitry 916 may include a ASIC that receives signals from connector 904, interprets the received signals and provides the information to controller 914, which can then perform an action based on the received information. Logic circuitry 916 can also receive inputs from controller 914 and communicate information to a connected accessory via connector 904.

Adapter 900 may also process signals related to USB, analog audio, UART, power, and exchange of messages associated with an accessory protocol between a connected portable electronic device via connector 902 and a connected accessory via connector 904. In addition, adapter 900 may also process one or more of the signals as illustrated in FIGS. 4 and 8.

It will be appreciated that the system configurations and components for adapter 900 described herein are illustrative and that variations and modifications are possible. The adapter may have other components not specifically described herein. Further, while the adapter is described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of devices including electronic devices implemented using any combination of circuitry and software.

In some embodiments, adapter 900 can enable accessories having a connector that is incompatible with the connector of a portable electronic device, to operate with the portable electronic device. In a particular embodiment, adapter 900 can have multiple modes of operation depending on which accessory is connected to it. As described above, there are various accessories that can be used with a portable electronic device; however, each of these accessories may have different operating requirements. Operating requirements for an accessory can include but are not limited to power level, type of input signals, type of output signals, configurations, etc. In order for the adapter to be able to act as an intermediary between the various accessories and a portable electronic device, the adapter must be able to communicate accessory information and signals to and from the portable electronic device. In order to accomplish this, adapter 900 may have multiple modes of operation. Each mode of operation is described in turn below.

In order to understand the various modes of operation of the adapter, it is first beneficial to understand the mechanism that the adapter may use to relay messages back and forth between an accessory and a portable electronic device.

As used herein, an adapter and a portable electronic device, or an accessory, are "connected" whenever a communication channel is established between their respective mating interfaces and "disconnected" when the channel is terminated. Such connection can be achieved via direct physical connection, e.g., with mating connectors.

In some embodiments, an adapter, a portable electronic device, and an accessory can communicate with each other by exchanging messages and data according to a portable electronic device accessory protocol, also referred to herein as an "accessory protocol." The messages and data can be communicated using the transport medium provided by the relevant interfaces of each of these devices. Where the accessory and the portable electronic device communicate via an intermediary such as adapter 900, the communication takes place across multiple links, e.g., a link from I/O interface 750 of accessory 706 to connector 904 of adapter 900, then a link from connector 902 of adapter 900 to accessory I/O interface 620 of portable electronic device 602. Communication in the reverse direction via these links is also possible. In some embodiments, each link uses the same transport, but this is not required. Each link can use the accessory protocol.

The accessory protocol defines a format for messages to be exchanged between the portable electronic device and any accessories connected thereto. For instance, the accessory protocol may specify that each message is sent in a packet with a header and an optional payload. The header provides basic information (e.g., a start indicator, length of the packet, and a message identifier identifying a type of message), while the payload provides any parameters or data associated with the message; the amount of associated data can be different for different messages, and some messages may provide for variable-length payloads. In some embodiments, the messages may be defined such that any particular message identifier is valid in only one direction. The packet can also include error-detection or error-correction codes as known in the art.

In some embodiments, every accessory (including accessory 706 and adapter 900) and every portable electronic device 602 that use the accessory protocol support at least a minimum set of "general" messages that are common to the portable electronic device and all accessories. The general messages can include messages enabling the portable electronic device and the accessory and the adapter to identify and authenticate themselves to each other and to provide general information about their respective capabilities, including which (if any) other messagees each supports. The general messages can also include authentication messages that the portable electronic device can use to verify the purported identity and capabilities of the accessory and the adapter (or vice versa), and the accessory or adapter (or portable electronic device) may be blocked from invoking certain (or all) messages if the authentication is unsuccessful.

Figure 10:
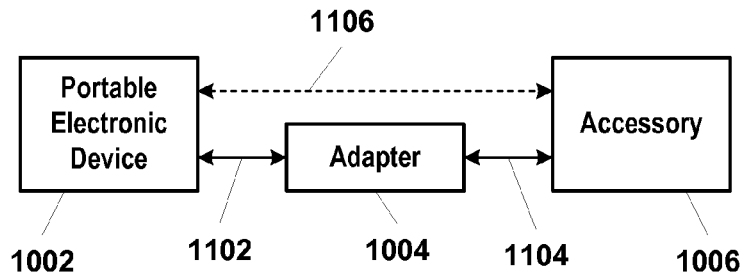
FIG. 10 is a block diagram of a system illustrating various communication channels according to an embodiment of the present invention.

As previously noted, and as described below, adapter 900 can interoperate with portable electronic device 602 and also provide a connection to another accessory 706. FIG. 10 illustrates an operating principle of an embodiment of the present invention. Portable electronic device 1002 is connected to adapter 1004 via a physical port 1102, and adapter 1004 is connected to accessory 1006 via a physical port 1104. In one embodiment, physical port 1102 can be implemented using accessory I/O interface 620 of portable electronic device 602 and connector 902 of adapter 900, and physical port 1104 can be implemented using connector 904 of adapter 900 and I/O interface 750 of accessory 706.

Through physical ports 1102 and 1104, a virtual port 1106 is created for communication between accessory 1006 and portable electronic device 1002. Accessory 1006 can send messages or other signals to portable electronic device 1002 using virtual port 1106 by sending the messages or other signals to adapter 1004 via physical port 1104. In some embodiments, accessory 1006 can send exactly the same messages and signals that it would send directly to portable electronic device 1002. Adapter 1004 detects signals from accessory 1006 and forwards them to portable electronic device 1002 via physical port 1102 in such a fashion that portable electronic device 1002 can determine that the signals originated from accessory 1006 rather than adapter 1004. Similarly, portable electronic device 1002 can send messages or other signals to accessory 1006 by sending them to adapter 1004 via physical port 1102 in such a fashion that adapter 1004 can determine that the signals should be delivered to accessory 1006. Adapter 1004 can forward such signals via physical port 1104 in such a fashion that they appear to accessory 1006 to have come directly from portable electronic device 1002. In other words, the existence of adapter 1004 can be completely transparent to accessory 1006.

Concurrently with implementing virtual port 1106, adapter 1004 can also interact with portable electronic device 1002, invoking functionality of portable electronic device 1002 and/or having its own functionality invoked by portable electronic device 1002, generally independently of accessory 1006. For example, adapter 1004 can send messages or other signals to portable electronic device 1002 via physical port 1102 in such a fashion that portable electronic device 1002 can determine that the signals originated from adapter 1004. Similarly, portable electronic device 1002 can send messages or other signals to adapter 1004 via physical port 1102 in such a fashion that adapter 1004 can determine that it should process these signals itself rather than forwarding them to accessory 1006. Such operations between portable electronic device 1002 and adapter 1004 can be transparent to accessory 1006.

It is to be understood that the term "accessory" as used herein refers to any electronic device capable of being connected to and interoperating with a portable electronic device. The term "adapter" as used herein refers generally to any accessory that also provides an additional connection interface for another accessory. Thus, an adapter is a type of accessory, but not all accessories need be adapters.

Figure 11:
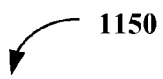
FIG. 11 is a table listing some of the messages that can be exchanged between the adapter and the portable electronic device according to an embodiment of the present invention.

In some embodiments, virtual port 1106 of FIG. 10 is implemented using messages of the accessory protocol exchanged between portable electronic device 1002 and adapter 1004. FIG. 11 is a table 1150 listing messages exchanged between the portable electronic device, the adapter, and the accessory according to an embodiment of the present invention. These messages can be implemented as part of a portable electronic device accessory protocol as general messages or another message type as desired. In table 1150, the direction of each message is indicated as A→P (for messages sent by an adapter to a portable electronic device) or P→A (for messages sent by a portable electronic device to an adapter). The payload refers to any parameters or data associated with each message.

The AddPortPresent message can be sent by adapter 1004 to portable electronic device 1002 to inform the portable electronic device that the adapter has at least one additional port. In some embodiments, unless the adapter sends this message, the portable electronic device may ignore any message sent using the virtual port. The portable electronic device may acknowledge receipt of this message. Upon acknowledgement by the portable electronic device, the adapter and the portable electronic device may communicate using the virtual port messages described below. Although not explicitly shown, adapter 1004 and portable electronic device 1002 may also exchange authentication messages in order to authenticate with each other.

The GetVPOptions message can be sent by adapter 1004 to portable electronic device 1002 to determine whether portable electronic device 1002 supports virtual port behavior, in particular, communication with multiple connected accessories in a daisy chain. The RetVPOptions message can be sent in response by portable electronic device 1002 with a byte code indicating whether portable electronic device 1002 supports virtual port behavior. In some embodiments, if adapter 1004 is connected to a portable electronic device that does not support virtual port behavior, adapter 1004 can disable interface/connector 904.

The VPEvent message can be sent by adapter 1004 to portable electronic device 1002 to notify portable electronic device 1002 of the status of the additional port, e.g., interface/connector 904. The payload of the VPEvent message can include a port type indicator, an event type indicator, and a structured bit field associated with the indicated port type and event type. The port type indicator can be used to specify the type (or types) of signals that adapter 1004 can exchange with accessory 1006. For example, if the accessory protocol specifies UART and USB as optional transport mechanisms, adapter 1004 can indicate to portable electronic device 1002 whether it can forward each of these signal types.

The event type indicator can be used to specify what type of information about the port state is being communicated. For example, in some embodiments, the accessory protocol provides that the connector includes a pair of identification pins that can be used by the portable electronic device to identify the type of connected accessory based on a resistance applied across the identification pins by the accessory. When accessory 1006 connects to interface 904 of adapter 1004, adapter 1004 can measure the resistance across the identification pins and report the resistance value to portable electronic device 1002 using an "accessory detect" event type indicator. Similarly, when an accessory disconnects, adapter 1004 can send a VPEvent message with the "accessory detect" event type indicator and a resistance value indicating an open circuit. Portable electronic device 1002 can process such messages as if it had directly measured the resistance on pins of its own connector.

As another example, in some embodiments where port 1104 is implemented using a multi-pin connector, an accessory need not connect to all pins of that connector. For example, if the connector includes pins for a digital signal protocol such as USB or FireWire but a particular accessory does not use these protocols, the corresponding pins may be disconnected. Likewise, the connector can include various pins for providing analog and/or digital audio and video output signals from the portable electronic device or delivering such signals to the portable electronic device. If a particular accessory does not use audio or video signaling or a particular format associated with certain pins, these pins may be disconnected.

In such embodiments, when accessory 1006 connects to interface 904/port 1104, adapter 1004 can determine which pins are actually connected and report the information to portable electronic device 1002 using a VPEvent message with a "characteristics" event type indicator. The bit field associated with this event type can include a bit mask for the various optional signals, allowing adapter 1004 to indicate which signal pins are or are not connected through to accessory 1006. In embodiments where adapter 1004 itself does not support connections on all pins, the same bit mask can be used with the bits for any unsupported pins set to the disconnected state regardless of whether the lack of support is within adapter 1004 or due to accessory 1006. In some embodiments, adapter 1004 can selectively connect or disconnect some of the signal paths from its port 1102 to its port 1104, and the "characteristics" event type can include a data field indicating which signals are selectively connectable.

In some embodiments, adapter 1004 can send a VPEvent message upon establishing that portable electronic device 1002 supports virtual port behavior to provide the initial status of port 1104. In this instance, the VPEvent message may include a port ID that uniquely identifies port 1104. This port ID may be used later by the VPControl, VPDataSend, and VPDataReceive messages. Adapter 1004 can send subsequent VPEvent messages asynchronously to notify portable electronic device 1002 of status changes, e.g., if an accessory connects or disconnects. In some embodiments, adapter 1004 may send the VPEvent message multiple times if it does not receive an acknowledgement from portable electronic device 1002 that it received the message. In some embodiments, until the VPEvent message is acknowledged by portable electronic device 1002, adapter 1004 cannot send any additional messages.

The VPControl message can be sent by portable electronic device 1002 to instruct adapter 1004 to set its port 1104 to a desired state. For example, portable electronic device 1002 can instruct adapter 1004 to enable or disable port 1104, or to change the state of any selectively connectable signal paths. Thus, for example, portable electronic device 1002 can instruct adapter 1004 to enable an accessory power path in port 1104.

The VPDataSend message can be sent by portable electronic device 1002 to instruct adapter 1004 to forward a message of the accessory protocol "downstream" to a connected accessory, e.g., accessory 1006. The payload of the VPDataSend message can include the message to be forwarded plus any associated data. In some embodiments, the payload can also include other components of a complete accessory protocol packet (e.g., packet header, start byte, error correction code); adapter 1004 can simply forward the payload as received to accessory 1006. In other embodiments, the payload includes only the message and data, and adapter 1004 can generate the surrounding packet structure before forwarding the packet to accessory 1006. In either case, accessory 1006 can receive a standard accessory protocol packet just as it would if directly connected to a portable electronic device. In some embodiments, adapter 1004 does not read or process the payload of a VPDataSend message. It simply unpackages the VPDataSend packet and transmits the payload to accessory 1006.

The VPDataReceive message can be sent by adapter 1004 to forward an accessory protocol packet containing a message (and possibly associated data) "upstream" from accessory 1006 to portable electronic device 1002. The payload can include the message being forwarded plus any associated data. In some embodiments, adapter 1004 forwards the received packet intact (including, e.g., header, start byte, error correction code) as the payload of the VPDataReceive message; in other embodiments, adapter 1004 can extract the received packet's message and data and include this information in the payload of the VPDataReceive message. In some embodiments, adapter 1004 does not read or process any messages sent by accessory 1006; it simply packages them into VPDataReceive messages and forwards them to portable electronic device 1002. Thus, accessory 1006 need not specify a destination for any message it sends.

The ChangeMode message can be sent by the portable electronic device to the adapter. As mentioned above, the adapter is capable of operating in multiple modes. This message can instruct the adapter to enable a particular mode. The payload for this message can be a mode ID that tells the adapter which mode to change to. Each operational mode of the adapter can be assigned a unique ID. Specific example of modes and selection of nodes is described below.

The ChangeModeComplete message can be sent by the adapter to the portable electronic device informing the portable electronic device that the mode change has been completed. The payload of the ChangeModeComplete message can be the mode ID of the currently active mode of the adapter. In some embodiments, the ChangeModeComplete message can be sent in response to the ChangeMode message. Once the portable electronic device receives the ChangeModeComplete message, it can verify that the adapter has enabled the same mode that it had requested via the ChangeMode message.

It will be appreciated that the messages described herein are illustrative and that variations and modifications are possible.

In some embodiments, each forwarded message to or from accessory 1006 is encapsulated in a single VPDataSend or VPDataReceive message packet. For example, the host device may generate a first message that includes a second message that is intended for the accessory. That is the second message is encapsulated by the first message. The first message is then sent to the adapter. The adapter strips the encapsulation and extracts the second message and forwards the second message to the accessory. In the reverse direction, the accessory may generate a message intended for the host device and send that message to the adapter. The adapter may then encapsulate that message with another message generated by the adapter and send the other message to the host device. The host device can then strip the encapsulation of the other message and recover the message sent by the accessory. In other embodiments, the messages being forwarded to or from the accessory can be treated as a byte stream, and a VPDataSend or VPDataReceive message packet may include part of a forwarded message, parts of two forwarded messages, or all of one forwarded message and part of another; that is, the number of VPDataSend or VPDataReceive messages need not match the number of messages communicated to or from accessory 1006.

As mentioned above, adapter 1004/900 can operate in multiple modes depending on the type of accessory connected to port 1104/connector 904. Initially, when the adapter is connected to the portable electronic device, all connections of port 1104 are floating or disabled. Upon connection to the portable electronic device, the adapter identifies and authenticates itself to the portable electronic device. Upon authentication (or concurrent to authentication) the adapter sets up the virtual port connection with the portable electronic device using the messages described above. Thereafter, the portable electronic device may instruct the adapter to enable port 1104. Once port 1104 is enabled, the adapter is ready to send and receive information via port 1104.

As noted above, adapter 1004 can operate in multiple modes to provide different combination of signals to accessory 1006. Some exampled will not be described.

Figure 12:
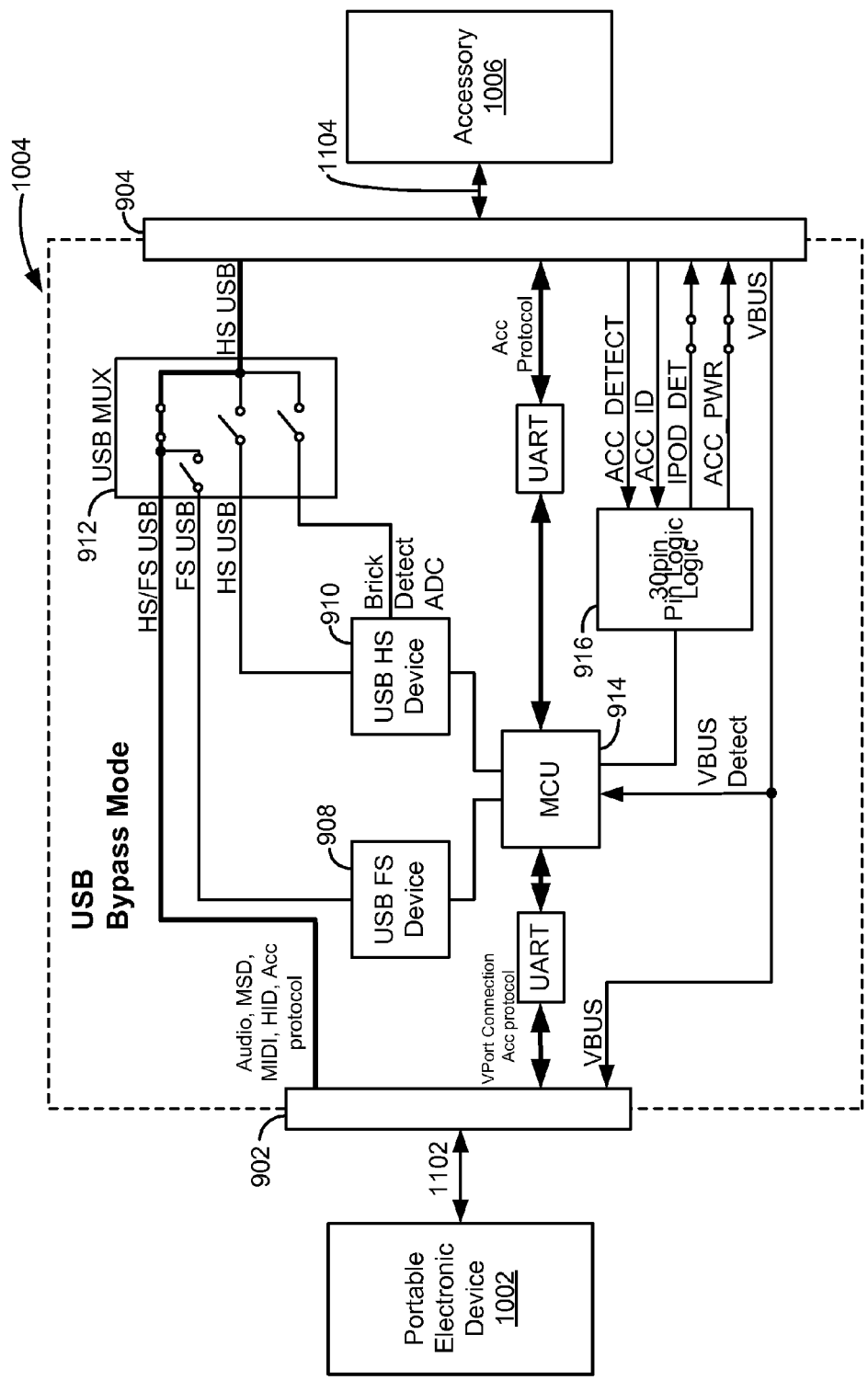
FIG. 12 illustrates signal path in the "bypass" mode of the adapter according to an embodiment of the present invention.

FIG. 12 is a diagram illustrating a signal path within adapter 1004 when the adapter is operating in a "bypass" mode according to an embodiment of the present invention. After the initial configuration described above, the adapter is ready to receive accessory 1006 connected via port 1104. Upon completion of the identification and authentication process described above, the portable electronic device may instruct the adapter to transition to the bypass mode. In some embodiments, the bypass mode may be the default mode that the adapter is placed in upon connection with the portable electronic device.

Once accessory 1006 is connected to port 1104, adapter 1004 forwards the accessory identification information to portable electronic device 1002. Portable electronic device 1002 interprets the accessory identification information and determines what type of accessory is accessory 1006. For example, consider that accessory 1006 is a USB charging unit, e.g., power supply, car charger, etc. that can provide charging voltage to portable electronic device 1002.

Upon connection of charging unit 1006 to the adapter, the adapter sends the identification information, e.g., a resistor ID, of the charging unit to the portable electronic device, e.g., using the VPEvent message. The portable electronic device then determines that a USB charging unit is connected to the adapter and instruct the adapter to operate in the bypass mode, e.g., by sending the ChangeMode message. In the bypass mode, the USB multiplexer 912 connects the active pins from connector 904 to pins in connector 902. In this mode, adapter 1004 acts as a pass-through device. Portable electronic device 1002 can then receive power over the VBUS line from charging unit 1006. In this mode, the virtual port messages described above may be communicated over the UART pathway illustrated in FIG. 12. In this instance, the presence of the adapter is transparent to the accessory.

Figure 13:
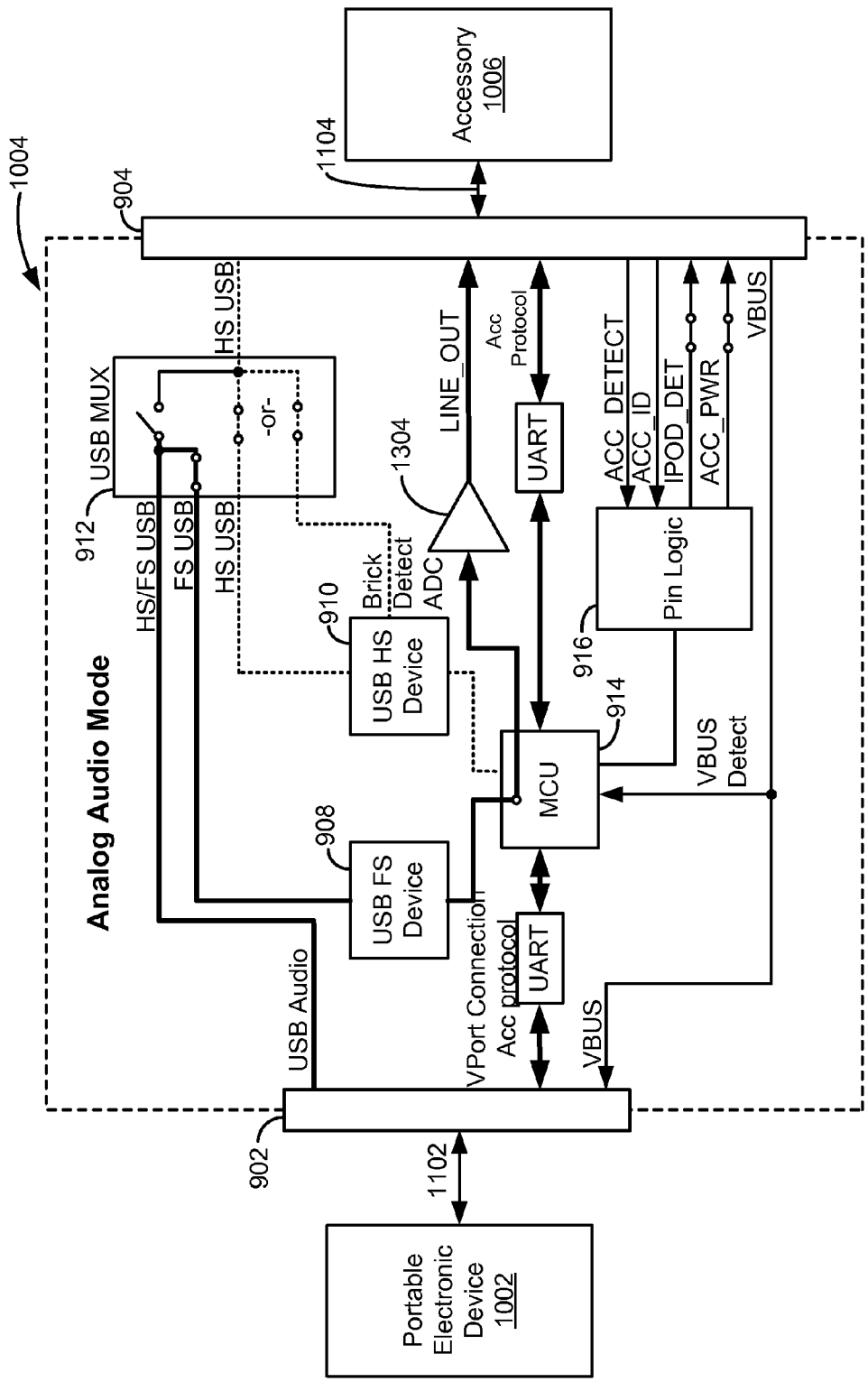
FIG. 13 illustrates signal path in the "analog audio" mode of the adapter according to an embodiment of the present invention.

FIG. 13 illustrates a mode in which the adapter supports transfer of analog audio from the portable electronic device to the accessory. The present disclosure refers to this mode as the "analog audio mode." In this instance, upon connection of the accessory to the adapter, the portable electronic device determines that the accessory, e.g., a speaker dock, needs analog audio input. Based on this determination, portable electronic device 1002 instructs adapter 1004 to enable the analog audio mode. In this mode, adapter 1004 enables USB device 908 and connects to portable electronic device 1002 via the audio pin of connector 904 by reconfiguring the connections in USB Mux 912. USB device 908 acts as a USB audio synchronization device. Portable electronic device 1002 outputs digital audio to the adapter via audio pin of connector 902. Adapter 1004 then converts the digital audio using USB device 908 and a digital to analog converter 1304 and outputs the analog audio over the line_out pin of connector 904. The accessory can then receive the analog audio and output the audio using, e.g., its speakers.

If the accessory is also able to provide charging voltage to the portable electronic device, the portable electronic device may also instruct the adapter to enable a charge path via the USB signal in this mode. In order to provide charging voltage to portable electronic device 1002, adapter 1004 enables USB device 910 and couples it to the USB pin of connector 904. This enables portable electronic device 1002 to receive charging voltage over the VBUS line as illustrated in FIG. 13.

Figure 14:
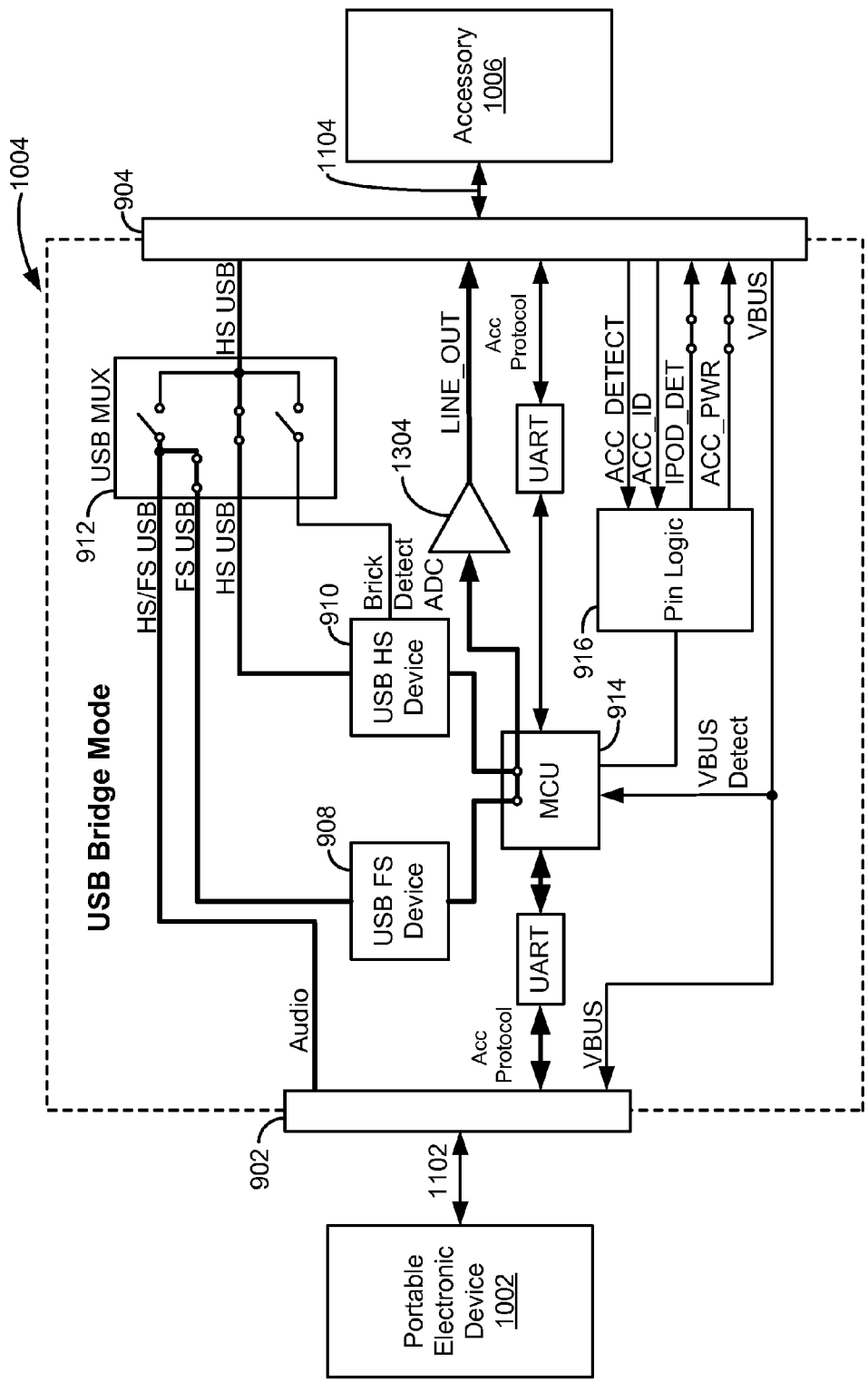
FIG. 14 illustrates signal path in the "bridge" mode of the adapter according to an embodiment of the present invention.

FIG. 14 illustrates yet another mode of operation of adapter 1004 according to an embodiment of the present invention. This mode is referred to herein as the "Bridge" mode. This mode may support an accessory 1006 that needs to communicate with the portable electronic device using the accessory protocol over the USB data line and also requests analog audio.

Initially when accessory 1006 is connected to adapter 1004, the adapter may be in the "bypass" mode discussed above and accessory 1006 can directly communicate with portable electronic device 1002. As part of this communication, the portable electronic device can determine the type of accessory connected and its operating requirements. If portable electronic device 1002 determines that accessory 1006 requests communication using the accessory protocol over the USB line and analog audio input, the portable electronic device instructs the adapter to enable the bridge mode, e.g., using the ChangeMode message. The portable electronic device then enters a host mode. In some embodiments, the adapter may disable connector 904 (thereby disconnecting the accessory) prior to entering the bridge mode. After entering the bridge mode, the adapter then re-enables connector 904 so that the accessory can communicate with the portable electronic device. In this mode, USB device 908 is coupled to the audio output of the portable electronic device via USB Mux 912. USB device 908 is also coupled to USB device 910 via controller 914. USB device 910 is coupled to the USB data line of connector 904 via USB Mux 912. USB device 908 is also coupled to an audio input pin of connector 904 via controller 914 in order to process the audio data.

In operation, USB device 908 may receive data from the portable media device via connector 902. USB device 908 cannot communicate directly with USB device 910. Hence, controller 914 receives the data from USB device 908 and forwards the data to USB device 910. In some embodiments, the two USB devices may operate using different protocols. For example, USB device 908 may be a full-speed USB device while USB device 910 may be a high speed USB device. Alternatively, one of the USB devices may use version 1.1 protocol and the other USB device may use version 2.0 or 3.0 protocol. In such instances, direct data transfer between the two USB devices may not be possible. Controller 914 acts as a "bridge" to properly convert the received data to the appropriate format before sending it to the portable media device and/or the accessory.

In operation, the portable electronic device outputs digital audio data using a USB audio output pin of connector 902. The digital audio data is processed by USB device 908 and microcontroller 914 and converted to analog audio. The analog audio is then input to the accessory via the audio input pin of connector 904.

If accessory 1006 wants to send any messages to the portable electronic device, e.g., for invoking some functionality of the portable electronic device or any other digital data, the message/data is output over the USB data pins of connector 904. The message/data is then processed by USB device 910 and sent to controller 914. Controller 914 acts as a bridge to transfer the message/data to USB device 908. USB device 908 then communicates the message/data to portable electronic device 1002 over the same USB audio pin of connector 902. If the portable electronic device wants to send message/data to the accessory, then the same path in reverse can be followed. Thus, portable electronic device 1002 can output audio and other non-audio data using the same USB data lines and accessory 1006 can receive the messages/non-analog audio data on its USB lines and receive analog audio data on its audio input line.

A USB device can only communicate with a USB host. In the bridge mode, both the accessory and the host device act as USB hosts in order to communicate with the two USB devices 910 and 908, respectively. As described above, the two USB devices cannot directly communicate with each other. In the bridge mode, the adapter effectively communicates data between the accessory and the host device by properly processing the data as needed.

The adapter can also operate in a "disconnect" mode where connector 904 (or port 1104) of the adapter is disabled. In this mode, even if an accessory is physically attached to connector 904, the accessory appears to the portable electronic device as "offline" and vice versa. The adapter may enter this disconnect mode when transitioning between the other modes described above. For example, if the adapter is in the "bypass" mode and receives an instruction from the portable electronic device to enter into the "bridge" mode, the adapter may first enter the "disconnect" mode and then enter the "bridge" mode. While the adapter is in the disconnect mode, the portable electronic device may configure its internal settings, e.g., configure MUX 912, in order to get ready to communicate with the accessory once the adapter transitions to the desired mode. For example, if the adapter is in the "bypass" mode the portable electronic device acts as a device that communicates directly with the accessory. But if the portable electronic device is communicating with the accessory with the adapter in the "bridge" mode, then the portable electronic device acts as host device for the accessory. Thus, while the adapter is transitioning from the "bypass" mode to the "bridge" mode, the portable electronic device can configure its internal settings so as to appear as a host device to the accessory.

Figure 15:
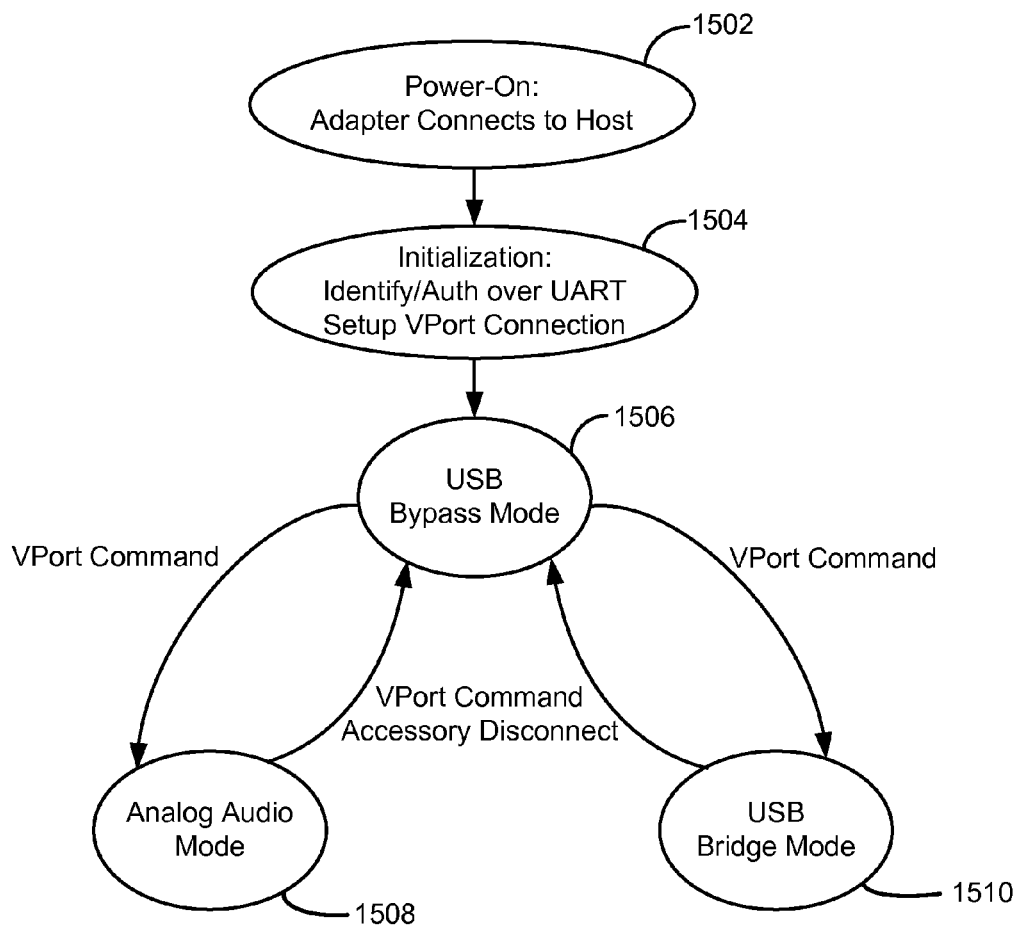
FIG. 15 is a state diagram representing some of the states of the adapter according to an embodiment of the present invention.

FIG. 15 is a state diagram illustrating the various modes of operation of the adapter according to an embodiment of the present invention. When the adapter is connected to the portable electronic device, the adapter may receive power from the portable electronic device and be in a powered on state 1502 ready to authenticate itself to the portable electronic device. Thereafter, the adapter can identify and authenticate itself to the portable electronic device. As part of the authentication process or following the authentication process, the adapter may set up the virtual port connection with the portable electronic device and be in an idle/ready state 1504. In some embodiments, the adapter may automatically transition to a default state 1506 upon being in idle/ready state 1504 for a predetermined time. As described above, in some embodiments, the default state may be the "bypass" mode. From the default state 1506, the adapter may either enter "bridge" mode state 1510 or the "analog audio" mode state 1508 after an accessory is connected to the adapter. The change of state can be effected via e.g., the ChangeMode message. Upon disconnection of the accessory from the adapter, the adapter returns to default state 1506 and waits for the next mode change message.

It will be appreciated that the various states described in reference to FIG. 15 are for illustrative purposes only. One skilled in the art will realize that various other states are possible depending on the adapter capabilities.

As described above, the adapter is capable of operating in multiple modes depending on which accessory is connected to the adapter. The portable electronic device instructs the adapter to switch to a particular mode based on the accessory connected to the adapter. The portable electronic device receives information about the accessory via the adapter and based on that information, the portable electronic device determines the type of accessory and identifies a mode that the adapter should be in so that the portable electronic device may communicate with the accessory. The information that the portable electronic device may use to determine the type of the accessory may include an accessory identifier, configuration information of the accessory, capabilities information of the accessory and the like. Once the portable electronic device selects a mode for the adapter, it sends an instruction to the adapter to switch to that selected mode. In some embodiments, the adapter may cycle through the "disconnect" mode before entering the selected mode. In other embodiments, the adapter may directly enable the selected mode without cycling through the disconnect mode.

Figure 16:
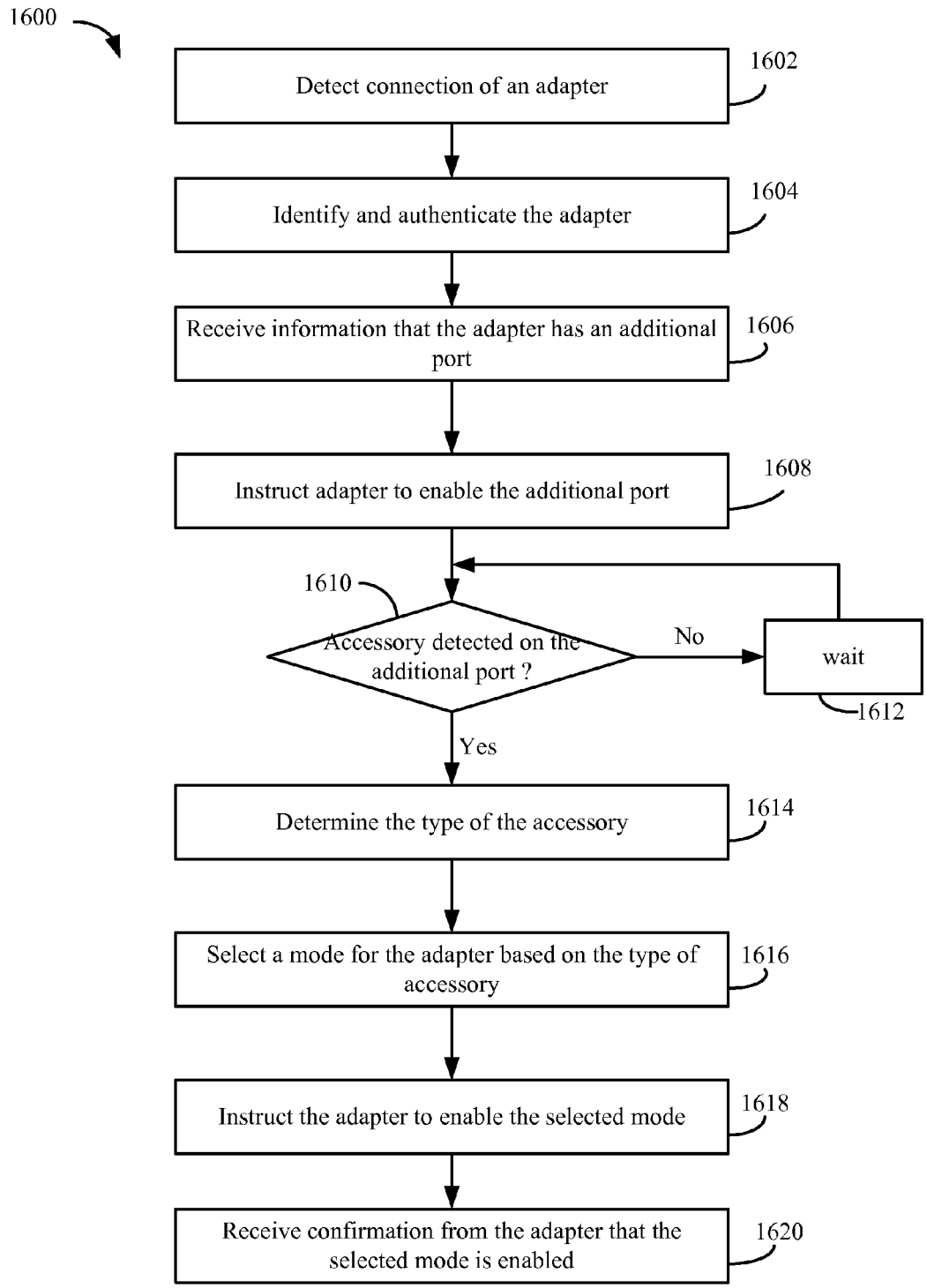
FIG. 16 is a flow diagram of a process for adapter operation according to an embodiment of the present invention.

FIG. 16 is a flow diagram of a process 1600 for operating an adapter according to an embodiment of the present invention. Process 1600 can be performed by, e.g., portable electronic device 130 of FIG. 2.

At step 1602, the portable electronic device can detect connection of an adapter, e.g., via connector 902 illustrated in FIG. 9. Once the adapter is connected to the portable electronic device, the adapter can identify itself to the portable electronic device and authenticate itself to the portable electronic device at step 1604. Thereafter, at step 1606, the portable electronic device may receive a message from the adapter informing the portable electronic device that the adapter has an additional port that may be used to connect to other accessories. In one embodiment, the adapter may send this information using the AddPortPresent message. Once the portable electronic device knows that the adapter has an additional port, it may instruct the adapter to enable the additional port at step 1608. As described above, until the portable electronic device instructs the adapter to enable the additional port, the adapter may by default maintain the additional port in a disabled or "disconnect" mode. In other embodiments, the adapter may automatically enable the additional port once the authentication is completed.

Thereafter the portable electronic device may wait to receive information from the adapter on whether an accessory is connected to the additional port. At step 1610, the portable electronic device may check whether it has received information from the adapter about an accessory connected to the additional port. As discussed above, the adapter may send identification information of the accessory to the portable electronic device. Based on that information the portable electronic device may determine whether an accessory is indeed connected to the additional port of the adapter. If the portable electronic device does not receive any accessory information from the adapter, the portable electronic device waits at step 1612 and keeps checking the data input lines on its connector to determine if the adapter has forwarded any accessory information.

If at step 1610 it is determined that the accessory is connected to the additional port of the adapter, i.e. the portable electronic device receives accessory information from the adapter, the portable electronic device determines, at step 1614, the type of accessory connected by analyzing the received accessory information. Once the portable electronic device determines the type of the accessory, it then selects a mode of operation for the adapter at step 1616. As described above, the adapter is capable of operating in multiple modes and the portable electronic device selects one of the multiple modes based on the type of the accessory. The portable electronic device then instructs the adapter to enable the selected mode at step 1618, e.g., using the ChangeMode message. Once the adapter enables the selected mode, the portable electronic device can receive a confirmation from the adapter, at step 1620, that the adapter has indeed enabled the requested mode.

It should be appreciated that the specific steps illustrated in FIG. 16 provide a particular method of operating the adapter according to an embodiment of the present invention. Other sequences of steps may also be performed according to alternative embodiments. For example, alternative embodiments of the present invention may perform the steps outlined above in a different order. Moreover, the individual steps illustrated in FIG. 16 may include multiple sub-steps that may be performed in various sequences as appropriate to the individual step. Furthermore, additional steps may be added or removed depending on the particular applications. One of ordinary skill in the art would recognize many variations, modifications, and alternatives. For example, in some embodiments, prior to step 1606, the portable electronic device may receive a message from the adapter asking whether the portable electronic device supports virtual port messages (i.e. messages to communicate with an accessory connected to the portable electronic device via the adapter), e.g., using the GetVPOptions message. The portable electronic device may respond indicating whether it supports or does not support virtual port messages, e.g., using the RetVPOptions message.

Figure 17A:
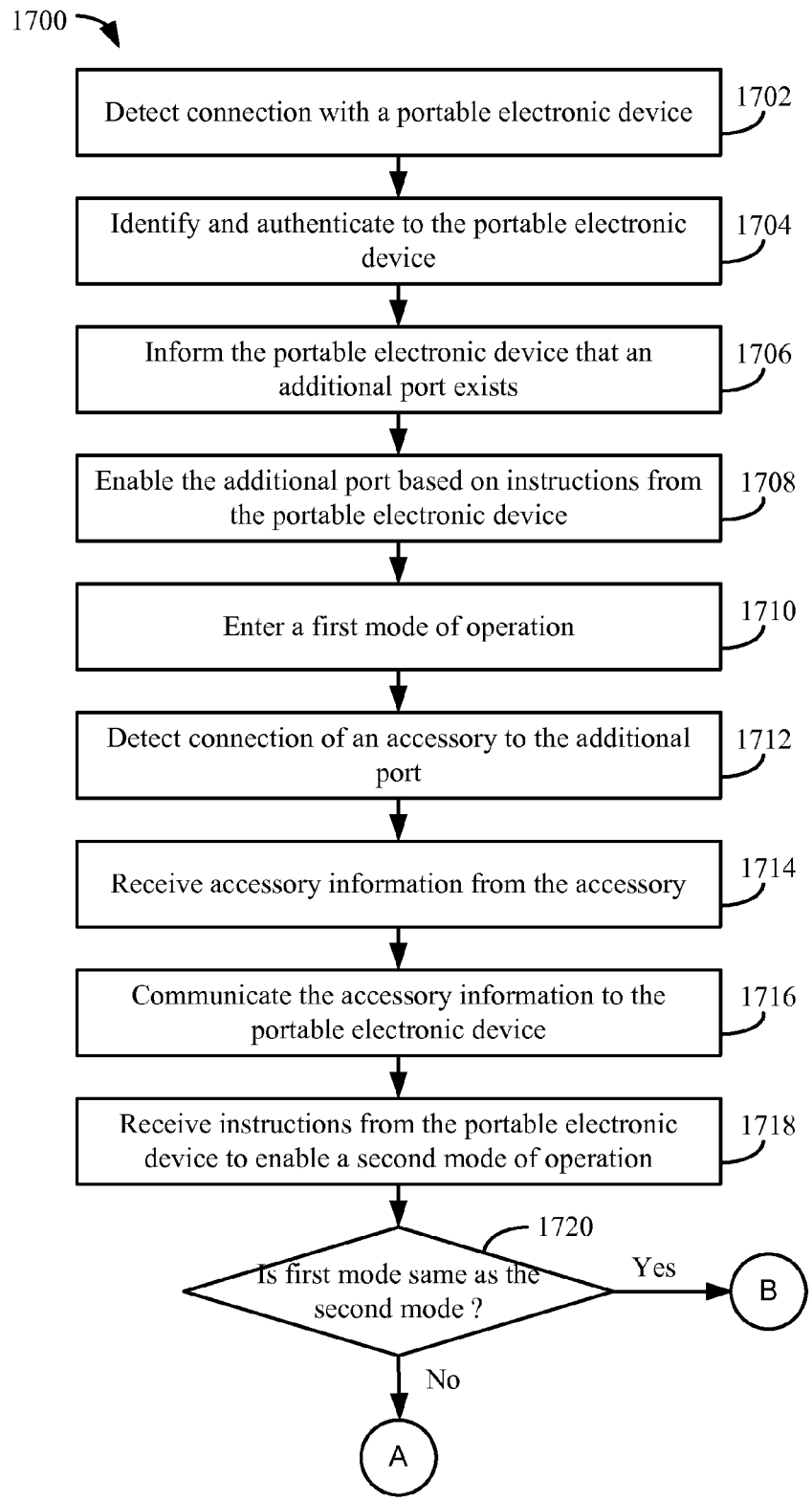
FIGS. 17A and 17B illustrate a flow diagram of a process for adapter operation according to another embodiment of the present invention.
Figure 17B:
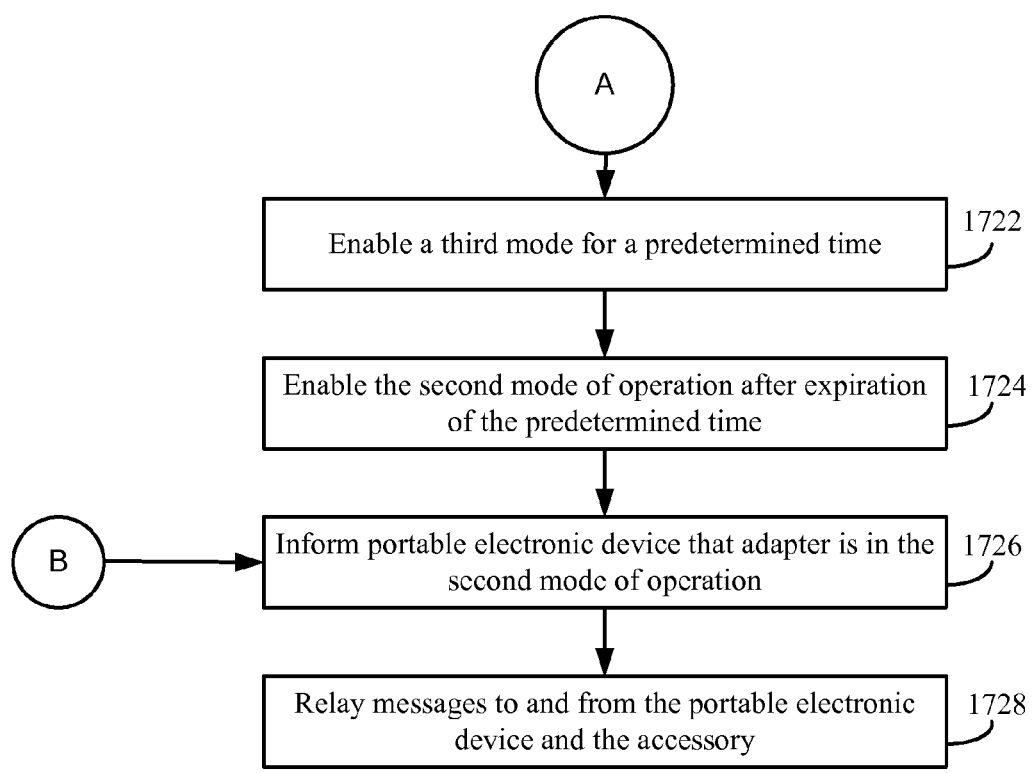

FIGS. 17A and 17B illustrate a flow diagram of a process 1700 for operating an adapter according to another embodiment of the present invention. Process 1700 can be performed, e.g., by adapter 150 of FIG. 2.

At step 1702, the adapter can detect connection with a portable electronic device. Once connected to the portable electronic device, the adapter can identify and authenticate itself to the portable electronic device at step 1704. Thereafter, at step 1706, the adapter can inform the portable electronic device that it has an additional port and provide the current status of that port to the portable electronic device. In some embodiments, the adapter may initially keep the additional port in a disabled mode. Thereafter, the adapter may receive instructions from the portable electronic device to enable the additional port and in response to the instructions; the adapter may enable the additional port at step 1708. In addition, optionally, the adapter may enter into a first (or default) mode of operation at step 1710. For example, in some embodiments, the "bypass" mode may be designated as the default mode. However, any one of the multiple operating modes of the adapter described above (or any other available mode) can be designated as the default mode.

At step 1712, the adapter may detect connection of an accessory via the additional port. Once the accessory is connected, the adapter may read accessory information or the accessory may send the accessory information to the adapter at step 1714. In some embodiments, the accessory information may include identification information that may help the portable electronic device to identify the accessory. The adapter communicates the accessory information to the portable electronic device at step 1716. Based on the accessory information, the portable electronic device makes a determination of what type of accessory is connected to the adapter and also determines a mode of operation for the adapter so that the portable electronic device may communicate with the accessory. It is to be noted that at this instant, the portable electronic device may be unable to communicate with the accessory. Once the portable electronic device determines that the adapter needs to be in a second mode, the adapter receives instructions from the portable electronic device to enable the second mode, at step 1718.

Upon receiving the instruction to change modes, the adapter may optionally, at step 1720, check to see if the currently active mode (i.e. the first mode) is same as the requested mode (i.e. second mode). If the currently active mode is same as the requested mode, the adapter may inform the portable electronic device that it is already in the requested mode. Referring now to FIG. 17B, if the requested mode is not the same as the current mode, the adapter may enable a third mode, e.g., disconnect mode, at step 1722, for a predetermined amount of time. During this time, the portable electronic device may also configure its internal circuitry to be able to communicate with the accessory. The accessory may see a momentary loss of connection with the adapter and/or the portable electronic device. At step 1724, the adapter may enable the requested (second) mode and thereafter inform the portable electronic device, at step 1726, that it has enabled the requested. Thereafter the adapter may relay message between the portable electronic device and the accessory at step 1728 in conformance with the selected mode.

It should be appreciated that the specific steps illustrated in FIG. 17 provide a particular method of operating the adapter according to an embodiment of the present invention. Other sequences of steps may also be performed according to alternative embodiments. For example, alternative embodiments of the present invention may perform the steps outlined above in a different order. Moreover, the individual steps illustrated in FIG. 17 may include multiple sub-steps that may be performed in various sequences as appropriate to the individual step. Furthermore, additional steps may be added or removed depending on the particular applications. One of ordinary skill in the art would recognize many variations, modifications, and alternatives.

Embodiments of the present invention may greatly enhance the user experience by making it easier to connect an accessory to a portable media device in the instance that they have non-compatible connectors. For example, since the adapter initializes in a state where the accessory connector is in a disabled state, it does not matter in what order the user connects the accessory, the adapter, and the portable media device. The user may either connect the adapter to the portable media device followed by connecting the accessory to the adapter or the user may first connect the accessory to the adapter and then connect the adapter to the portable media device. Also, the portable media device determines the correct mode of operation for the adapter and instructs the adapter to switch to that mode. This relieves the user from the additional step of selecting the appropriate mode, which can be especially useful for users who are not very technology savvy. In addition, the automatic selection of the adapter mode ensures that the correct mode is selected resulting in less operator errors which may be introduced if the user has to select the mode.

As described above, the portable media device determines the mode of operation of the adapter. In instances where a change to the mode selection rules is to made, such a change can be easily effected by updating the firmware of the portable media device without having to change the adapter firmware. The adapter can continue to operate in the mode selected by the portable media device. In some embodiments, the adapter communicates with the portable media device using only the UART data pins. In this instance, whenever the portable media device receives a message over the USB data pins, the portable media device can conclude that the message was generated by the accessory and not the adapter. This is an additional way for the portable media device to determine the origin of a message. In this embodiment, the VPDataSend and/or the VPDataReceive messages may not be needed.

In some embodiments, the portable media device may support multiple accessory protocols. Therefore if the accessory uses an older version of the accessory protocol, the portable media device can still communicate with the accessory using the adapter and techniques described above.

In the embodiments described above, the portable media device instructions the adapter to enable a particular mode. However this is not the only way of communicating with the accessory. In other embodiments, the adapter may detect connection of an accessory, receive the accessory information, and determine which mode is the most appropriate for communicating with the accessory. The adapter may then change its mode accordingly and then inform the portable media device that a particular mode is enabled and that the accessory is now ready to communicate with the portable media device. In this instance, the adapter may use similar techniques as described above to determine the proper mode of operation based on the accessory information.

In still other embodiments, the adapter can receive the accessory information and instruct the portable media device to change to a particular mode of operation of the portable media device. In some embodiments, the adapter may then also change its own mode of operation to match the portable media devices' mode. In this instance, the adapter may use similar techniques as described above to determine the proper mode of operation based on the accessory information.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. An adapter comprising:
   a first connector to mate with a corresponding connector to a host device;
   a second connector to mate with a corresponding connector on an accessory; and
   a housing to support for the first connector and the second connector and enclosing internal circuitry, the internal circuitry comprising:
   a first universal serial bus device selectively coupled to the first connector;
   a second universal serial bus device selectively coupled to the second connector; and
   a controller coupled between the first universal serial bus device and the second universal serial bus device,
   wherein the adapter is configurable to operate in a bypass mode where a universal serial bus path is configured to route signals between the first connector and the second connector bypassing the first universal serial bus device and the second universal serial bus device,
   wherein the adapter is further configurable to operate in an analog audio mode where a universal serial bus path is configured to route signals from the first connector to the first universal serial bus device; and
   wherein the adapter is further configurable to operate in a bridge mode where a first universal serial bus path is configured to route signals from the first connector to the first universal serial bus device and a second universal serial bus path is configured to route signals from the second connector to the second.

2. The adapter of claim 1 wherein the adapter further comprises a multiplexer, and when the adapter is configured to operate in a bypass mode, the multiplexer routes the universal serial bus path from the first connector to the second connector.

3. The adapter of claim 2 wherein when the adapter is in the analog audio mode, the first universal serial bus device provides an output to a digital-to-analog converter, wherein the digital to analog converter provides an analog audio signal to the second connector.

4. The adapter of claim 3 wherein when the adapter is in the bridge mode, the controller provides a communication path from the first universal serial bus device to the second universal serial bus device.

5. The adapter of claim 1 wherein when the adapter is in the bypass mode, the adapter provides a universal serial bus path for the host device and accessory to communicate directly with each other.

6. The adapter of claim 5 wherein when the adapter is in the analog audio mode, the host device provides an analog audio signal to the accessory.

7. The adapter of claim 6 wherein when the adapter is in the analog audio mode, the host device provides an audio signal to the accessory by providing a universal serial bus signal to the first universal serial bus device via the first connector, where the universal serial bus device provides a signal to the controller, which provides an audio signal to the digital-to-analog converter, which provides the analog signal to the accessory via the second connector.

8. The adapter of claim 6 wherein when the adapter is in the bridge mode, the adapter provides a universal serial bus path for the host device and accessory to communicate with each other and the host device provides an analog audio signal to the accessory.

9. The adapter of claim 8 wherein when the adapter is in the bridge mode, the adapter provides a universal serial bus path for the host device and accessory to communicate with each other through the first universal serial bus device and the second universal serial bus device.

10. An adapter comprising:
a first connector to mate with a corresponding connector to a host device;
a second connector to mate with a corresponding connector on an accessory; and
a housing to support for the first connector and the second connector and enclosing internal circuitry, wherein the internal circuitry comprises:
a universal asynchronous receiver/transmitter path to provide adapter identification and authentication information for the adapter to the host device; and
a universal serial bus path to initially provide accessory identification information from the accessory to the host device when the adapter is in a bypass mode, wherein depending on the accessory identification information, the adapter either remains in the bypass mode where the accessory provides a communication path between the host and the accessory, or the adapter changes to one of a plurality of alternative modes.

11. The adapter of claim 10 wherein the plurality of alternative modes comprises an analog audio mode, the host device provides an analog audio signal to the accessory.

12. The adapter of claim 11 wherein the plurality of alternative modes comprises a bridge mode where the adapter provides a universal serial bus path for the host device and accessory to communicate with each other and the host device provides an analog audio signal to the accessory.

13. The adapter of claim 11 wherein the adapter further comprises a multiplexer, and when the adapter is configured to operate in a bypass mode, a multiplexer routes the universal serial bus path from the first connector to the second connector.

14. The adapter of claim 13 wherein when the adapter is in an analog audio mode, a first universal serial bus device provides an output to a digital-to-analog converter, wherein the digital to analog converter provides an analog audio signal to the second connector.

15. The adapter of claim 14 wherein when the adapter is in a bridge mode, a controller provides a communication path from the first universal serial bus device to a second universal serial bus device.

16. An adapter comprising:
a first connector to mate with a corresponding connector to a host device;
a second connector to mate with a corresponding connector on an accessory; and
a housing to support for the first connector and the second connector and enclosing internal circuitry, wherein the internal circuitry:
detects a connection with a host device;
provides adapter identification and authorization information to the host device;
informs the host that the adapter has an additional port;
receives instructions from the host to enable the additional port and enables the additional port,
enters a bypass mode of operation;
detects connection of an accessory to the additional port;
provides a path for the accessory to provide accessory identification information to the host device; and
receives instructions from the host device to enter a second mode of operation, wherein the second mode may be the same or different than the bypass mode of operation.

17. The adapter of claim 16 wherein when the second mode is different than the bypass mode, the internal circuitry enters a disconnect mode where the accessory is disconnected for a predetermined time.

18. The adapter of claim 17 wherein after the adapter enters the second mode, the internal circuitry informs the host that the adapter is in the second mode.

19. The adapter of claim 16 wherein the adapter provides identification and authorization information to the host device over a universal asynchronous receiver/transmitter path.

20. The adapter of claim 19 wherein the adapter provides accessory identification information from the accessory to the host over a universal serial bus path.

* * * * *